United States Patent
Lee et al.

(10) Patent No.: US 10,855,638 B2
(45) Date of Patent: Dec. 1, 2020

(54) METHOD, SYSTEM, AND RECORDING MEDIUM FOR NOTIFYING RECEPTION OF MESSAGE

(71) Applicant: NAVER Corporation, Seongnam-si (KR)

(72) Inventors: YungSeong Lee, Seongnam-si (KR);
HyeonJi Jeon, Seongnam-si (KR); Sun Young Park, Seongnam-si (KR);
KeonSu Lee, Seongnam-si (KR);
MunHyun Joo, Seongnam-si (KR);
ByoungSeung Lee, Seongnam-si (KR);
Hak Jin Doh, Seongnam-si (KR);
KiDoo Han, Seongnam-si (KR); Chan Hyuk Sung, Seongnam-si (KR);
MyongWon Seo, Seongnam-si (KR);
Jeong Hwa Kim, Seongnam-si (KR);
Hyo Jung Kim, Seongnam-si (KR);
Joseph Yeo, Seongnam-si (KR);
KyoHee Chang, Seongnam-si (KR);
Seong Woo Sim, Seongnam-si (KR);
DoHoon Kim, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 818 days.

(21) Appl. No.: 15/239,458

(22) Filed: Aug. 17, 2016

(65) Prior Publication Data
US 2017/0054670 A1 Feb. 23, 2017

(30) Foreign Application Priority Data

Aug. 18, 2015 (KR) .................. 10-2015-0115988

(51) Int. Cl.
*G06F 15/16* (2006.01)
*H04L 12/58* (2006.01)
(Continued)

(52) U.S. Cl.
CPC ............ *H04L 51/24* (2013.01); *G06F 3/0481* (2013.01); *G06Q 10/107* (2013.01); *H04L 51/02* (2013.01);
(Continued)

(58) Field of Classification Search
CPC ......... H04L 51/24; H04L 51/02; H04L 51/12; H04M 1/72552; G06Q 10/107;
(Continued)

(56) References Cited

U.S. PATENT DOCUMENTS

| | | | |
|---|---|---|---|
| 8,614,968 B1 * | 12/2013 | Cody ................ | H04M 1/72519 370/260 |
| 8,994,671 B2 * | 3/2015 | Reeves ................ | G06F 3/1438 345/173 |

(Continued)

FOREIGN PATENT DOCUMENTS

| | | |
|---|---|---|
| JP | 2004054343 A | 2/2004 |
| JP | 2007-122438 A | 5/2007 |

(Continued)

OTHER PUBLICATIONS

Japanese Office Action dated Jul. 11, 2017 by the Japanese Patent Office corresponding to Japanese patent application No. 2016-153128.
(Continued)

*Primary Examiner* — Thuong Nguyen
(74) *Attorney, Agent, or Firm* — Greer Burns & Crain Ltd.

(57) ABSTRACT

Provided are a message reception notifying method, system, and non-transitory computer-readable recording medium. A message reception notifying method includes predefining a plurality of message types for classifying a message and frames of a notification window for the respective message types; parsing a message received at a user terminal, and
(Continued)

determining a type of the received message among the plurality of message types; determining a frame corresponding to the type of the received message among the frames; and creating and providing a notification window for the received message by processing the received message based on the determined frame.

20 Claims, 18 Drawing Sheets

(51) Int. Cl.
  *G06F 3/0481*    (2013.01)
  *G06Q 10/10*    (2012.01)
  *H04M 1/725*    (2006.01)
  *H04W 4/12*    (2009.01)
  *G06Q 40/02*    (2012.01)
  *G06Q 30/02*    (2012.01)

(52) U.S. Cl.
  CPC ........ *H04L 51/12* (2013.01); *H04M 1/72552* (2013.01); *G06Q 30/0241* (2013.01); *G06Q 40/02* (2013.01); *H04W 4/12* (2013.01)

(58) Field of Classification Search
  CPC .. G06Q 40/02; G06Q 30/0241; G06F 3/0481; H04W 4/12
  USPC ........... 709/206, 224; 455/412.2, 556.2, 566, 455/575.8, 458; 370/260
  See application file for complete search history.

(56) References Cited

U.S. PATENT DOCUMENTS

| | | | | |
|---|---|---|---|---|
| 2005/0268104 | A1* | 12/2005 | Sugishita | H04N 1/0035 713/176 |
| 2006/0007486 | A1* | 1/2006 | Tanimoto | H04N 1/00214 358/1.15 |
| 2007/0032267 | A1* | 2/2007 | Haitani | H04M 1/274508 455/556.2 |
| 2007/0162339 | A1* | 7/2007 | Arning | G06Q 10/107 705/14.1 |
| 2008/0134052 | A1* | 6/2008 | Davis | G06Q 10/10 715/744 |
| 2008/0139176 | A1* | 6/2008 | Kim | H04M 1/72547 455/412.1 |
| 2009/0042542 | A1* | 2/2009 | Dias | H04M 1/72552 455/412.1 |
| 2009/0093273 | A1* | 4/2009 | Dietrich Klassen | H04M 1/72552 455/566 |
| 2009/0094331 | A1* | 4/2009 | Nobori | G06F 15/16 709/205 |
| 2010/0030798 | A1* | 2/2010 | Kumar | G06F 16/954 707/737 |
| 2010/0087173 | A1* | 4/2010 | Lin | H04L 51/16 455/412.2 |
| 2011/0131221 | A1* | 6/2011 | Bhide | G06F 16/951 707/755 |
| 2011/0294467 | A1* | 12/2011 | Kim | G06F 1/1643 455/411 |
| 2012/0165072 | A1* | 6/2012 | Griffin | H04M 1/0235 455/566 |
| 2012/0221901 | A1* | 8/2012 | Tanaka | G06F 11/0709 714/57 |
| 2012/0311493 | A1* | 12/2012 | Sohn | H04M 1/72547 715/808 |
| 2014/0067507 | A1* | 3/2014 | Costello | G06Q 30/02 705/14.27 |
| 2014/0067963 | A1* | 3/2014 | Chavez | G06Q 10/107 709/206 |
| 2014/0351744 | A1 | 11/2014 | Jeon et al. | |
| 2015/0155903 | A1* | 6/2015 | Jang | H04B 1/3888 455/575.8 |
| 2015/0341903 | A1* | 11/2015 | Jeong | H04W 68/02 455/458 |
| 2017/0054670 | A1* | 2/2017 | Lee | H04L 51/24 |
| 2018/0081525 | A1* | 3/2018 | Wang | G06F 3/04886 |

FOREIGN PATENT DOCUMENTS

| | | |
|---|---|---|
| JP | 2007148939 A | 6/2007 |
| JP | 2008-305406 A | 12/2008 |
| JP | 2010-087759 A | 4/2010 |
| JP | 2010-0176248 A | 8/2010 |
| JP | 2014-519126 A | 8/2014 |
| KR | 10-2005-0073704 | 7/2005 |
| KR | 10-2006-0104298 | 10/2006 |
| KR | 10-2009-0002940 | 1/2009 |
| KR | 10-2012-0060570 | 6/2012 |
| KR | 10-2014-0067507 | 6/2014 |
| KR | 10-2014-0133679 | 11/2014 |
| WO | WO 2015/088853 A1 | 6/2015 |

OTHER PUBLICATIONS

Japanese Office Action dated Mar. 6, 2018 by the Japanese Patent Office corresponding to Japanese patent application No. 2016-153128.

Korean Office Action dated Jul. 25, 2016 by the Korean Patent Office corresponding to Korean patent application No. 10-2015-0115988.

\* cited by examiner

METHOD, SYSTEM, AND RECORDING MEDIUM FOR NOTIFYING RECEPTION OF MESSAGE

CROSS-REFERENCE TO RELATED APPLICATION(S)

This application claims priority under 35 U.S.C. §119 to Korean Patent Application No. 10-2015-0115988 filed on Aug. 18, 2015, in the Korean Intellectual Property Office (KIPO), the entire contents of which are incorporated herein by reference.

BACKGROUND

Field

One or more example embodiments relate to technology for providing a notification of a received message.

Description of Related Art

A messaging application that enables users to receive and send messages has become an essential configuration element at a terminal. For example, a short message service (SMS), a multimedia messaging service (MMS), and the like, are generally used to send and receive text messages and/or video messages between terminals.

In general, once a message is received at a terminal, the terminal may notify that the message is received using a ringback tone, a vibration, a lamp (mute), etc., preset at the terminal by a user.

In addition, a message reception notifying method may include a method of displaying an icon indicating a reception of a new message on a status bar or a task bar of a terminal, a method of displaying at least a portion of content of a received message or a notification message notifying a reception of a message in a popup form, etc.

SUMMARY

One or more example embodiments provide a message reception notifying method, system, and non-transitory computer-readable recording medium that may provide a different format of a notification window based on a type of a received message.

One or more example embodiments also provide a message reception notifying method, system, and non-transitory computer-readable medium that may flexibly configure and provide a notification window for a received message based on a type of the received message.

According to an aspect of one or more example embodiments, there is provided message reception notifying method configured in a computer, the method including predefining a plurality of message types for classifying a message and frames of a notification window for the respective message types; parsing a message received at a user terminal, and determining a type of the received message among the plurality of message types; determining a frame corresponding to the type of the received message among the frames; and creating and providing a notification window for the received message by processing the received message based on the determined frame.

The plurality of message types for classifying the message may be defined based on at least one of criteria that include information regarding whether file download link information is included in the message, whether a file to be downloaded through the message is included in a malicious code database, whether an authentication number or an approval number is included in the message, whether sender information of the message is included in a financial company information database, whether card payment details are included in a text of the message, whether payment due information is included in the text of the message, whether banking transaction details are included in the text of the message, and whether a desired phrase or keyword is included in the text of the message.

The defining of the frames for the respective message types may include defining at least one of a display attribute and a user interface (UI) button of a frame for each type.

The creating and the providing may include creating a notification window of which a frame has a different display attribute based on the type of the received message.

The creating and the providing may include creating a notification window that interworks with at least one of an itinerary function for registering an itinerary associated with the message and a quick reply function for directly sending a reply on the notification window.

The creating and the providing may include creating a notification window of which a UI button has a different configuration based on the type of the received message, and configuring the UI button to have at least one of a function of deleting a message based on a message type, a function of processing a message to be read, a function of adding a message to a block list, a function of adding a message to a safe list, a function of copying at least a portion of content of a message, a function of transferring a reply using a common phrase, a function of registering an itinerary associated with a message, a function of adding a tag to a message, a function of providing accumulated information or statistical information associated with a message, a function of changing a message type, a function of landing a delivery reference page through a link included in a message, and a function of setting a re-alerting time or a repeating period of a notification window for a message.

The creating and the providing may include displaying a notification window for a new message in a popup form on a screen of the user terminal in response to the new message being received at the user terminal.

The message reception notifying method may further include providing notification information about the received message in a banner form.

The providing of the notification information may include displaying a message that is processed to be unread in a message box associated with the user terminal in a form of a notification banner on one side of a UI screen on which a message list of the message box is displayed.

The message reception notifying method may further include providing a notification center in which notification information about the received message is configured as a card list.

The providing of the notification center may include configuring received messages that are processed to be unread as a card list using a card having a different display attribute based on a message type.

The message reception notifying method may further include providing additional information associated with the received message at one or more locations adjacent to the notification window.

According to an aspect of one or more example embodiments, there is provided a non-transitory computer-readable recording medium storing a computer program to implement a method including predefining a plurality of message types for classifying a message and frames of a notification window for the respective message types; parsing a message received at a user terminal, and determining a type of the received message among the plurality of message types;

determining a frame corresponding to the type of the received message among the frames; and creating and providing a notification window for the received message by processing the received message based on the determined frame.

According to an aspect of one or more example embodiments, there is provided message reception notifying system, wherein a plurality of message types for classifying a message and frames of a notification window for the respective message types are predefined, and the message reception notifying system includes a determiner configured to parse a message received at a user terminal, and to determine a type of the received message among the plurality of message types; and a provider configured to determine a frame corresponding to the type of the received message among the frames, and to create and provide a notification window for the received message by processing the received message based on the determined frame.

The plurality of message types for classifying the message may be defined based on at least one of criteria that include information regarding whether file download link information is included in the message, whether a file to be downloaded through the message is included in a malicious code database, whether an authentication number or an approval number is included in the message, whether sender information of the message is included in a financial company information database, whether card payment details are included in a text of the message, whether payment due information is included in the text of the message, whether banking transaction details are included in the text of the message, and whether a desired phrase or keyword is included in the text of the message.

The provider may be further configured to create a notification window of which a frame has a different display attribute or a notification window of which a UI button has a different configuration based on the type of the received message.

The provider may be further configured to create a notification window that interworks with at least one of an itinerary function for registering an itinerary associated with the message and a quick reply function for directly sending a reply on the notification window.

The provider may be further configured to provide notification information about the received message in a banner form, and to display a message that is processed to be unread in a message box associated with the user terminal in a form of a notification banner on one side of a UI screen on which a message list of the message box is displayed.

The provider may be further configured to provide a notification center in which notification information about the received message is configured as a card list, and to configure received messages that are processed to be unread as a card list using a card having a different display attribute based on a message type.

The provider may be further configured to provide additional information associated with the received message at one or more locations adjacent to the notification window.

According to some example embodiments, it is possible to further effectively notify a reception of a message by providing a message-oriented notification environment using a different format of a notification window based on a message type.

Also, according to some example embodiments, it is possible to improve accessibility to a message related function by providing a UI included in a notification window into consideration of a user action predictable based on content of a message and by flexibly configuring the UI based on a message type.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

Figure 1:
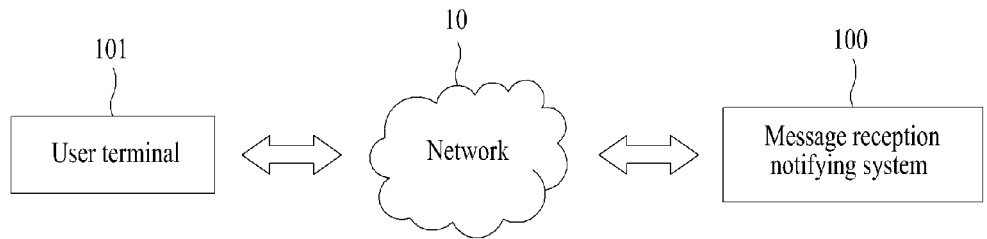
FIG. 1 is a diagram illustrating a message reception notifying environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

Example embodiments relate to technology for providing a notification of a received message, and more particularly, to a message reception notifying method, system, and non-transitory computer-readable recording medium that may provide a different format of a notification window based on the type of a received message (also, interchangeably used with a message type).

The term "message" used herein refers to unit information transmitted through a short message service (SMS), a multimedia messaging service (MMS), an enhanced messaging service (EMS), an instant messenger, a social network service (SNS), an email, and the like, and may inclusively indicate any type of data transmitted and received between terminals over a communication network.

FIG. 1 is a diagram illustrating a message reception notifying environment according to at least one example embodiment. FIG. 1 illustrates a user terminal 101 and a message reception notifying system 100. In FIG. 1, indicators with arrowheads may indicate that data is transmitted and received between the user terminal 101 and the message reception notifying system 100 over a wired/wireless network 10.

The user terminal 101 may execute one or more processors configured to perform at least one of the features described herein. The user terminal 101 may indicate any type of mobile terminals capable of installing and executing a service exclusive application (hereinafter, a message app) associated with the message reception notifying system 100. Here, the user terminal 101 may perform the overall service operation, such as service screen configuration, data input, data transmission and reception, data storage, etc., under control of the message app.

For example, the user terminal 101 may include a personal computer (PC), a notebook computer, a laptop computer, a smartphone, a tablet, a wearable computer, etc., however, is not limited thereto.

The user terminal 101 may directly or indirectly connect to the network 10, for example, the Internet, a local area network (LAN), etc. For example, a PC and a notebook computer may be directly connected to the network 10 through a wired network connection. A laptop computer may be wirelessly connected to the network 10 through a wireless communication channel set between the laptop computer and a wireless access point (WAP). A smartphone may be wirelessly connected to the network 10 through a wireless communication channel set between the smartphone and a cellular network/bridge. Here, the network 10 may communicate with one or more secondary networks (not shown), for example, a LAN, a wide area network (WAN), and an intranet, however, is not limited thereto.

The user terminal 101 may interface with the message reception notifying system 100 over the network 10.

The message reception notifying system 100 may execute one or more processors configured to perform at least one of the features described herein. The message reception notifying system 100 may provide a message reception notification for a message received at the user terminal 101 to the user terminal 101 that is a client in which the message app is installed. In particular, the message reception notifying system 100 may verify content of the received message by parsing the received message and may provide a different format of a notification window based on the verified content of the message, and may flexibly configure and provide a user interface (UI) included in the notification window based on the content of the message.

The message app associated with the message reception notifying system 100 may include a function of providing a notification window for a received message, a function that interworks with an itinerary function, a quick reply function using a common phrase or the like, a function of providing a notification banner for a received message, a function of providing a notification center for managing a message reception notification, etc.

The message app is configured to be available in a mobile environment as well as a PC environment. The message app may be configured in an independently operating program form to operate in conjunction with a specific application, for example, a messaging application such as an SMS or an MMS, a messenger application, a mail application, an SNS application etc., associated with a message, or may be configured in an in-app form of the specific application to be operable on the application.

At least a portion of constituent elements of the message reception notifying system 100 may be configured in a form of an application installed on the user terminal 101, or may be configured to be included in a platform that provides a service in a client-server environment.

The message reception notifying system 100 corresponds to a server computer and may include, for example, a server computing device, a PC, a server computer, a series of server computers, a mini computer, and/or a main frame computer, however, is not limited thereto. The server system may be a distributive system and operations of the server system may be concurrently and/or sequentially executed on one or more processors.

Figure 2:
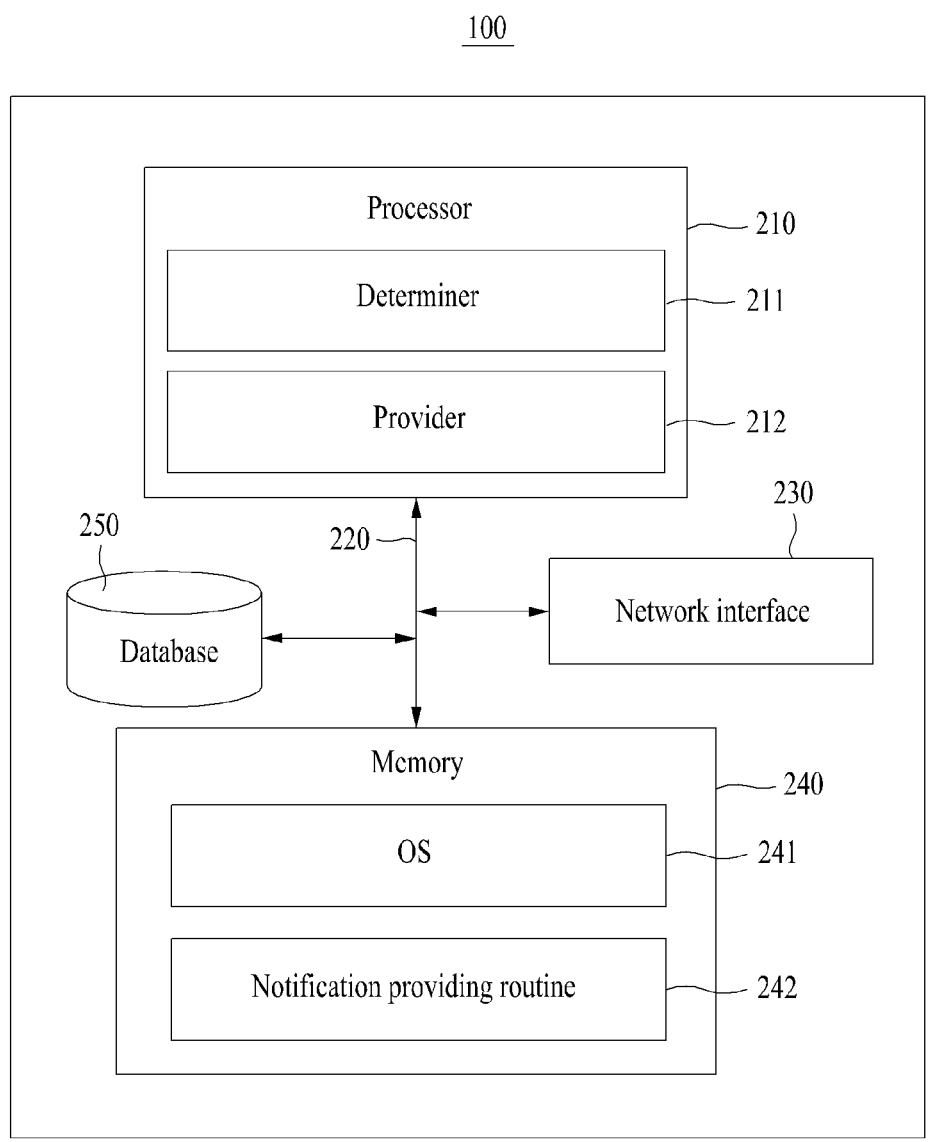
FIG. 2 is a block diagram illustrating a configuration of a message reception notifying system according to at least one example embodiment.
Figure 3:
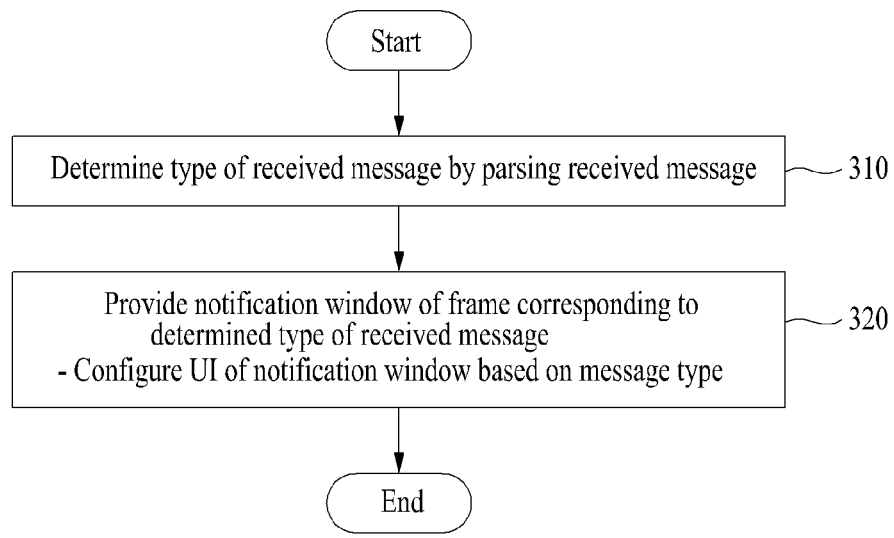
FIG. 3 is a flowchart illustrating a message reception notifying method according to at least one example embodiment.

FIG. 2 is a block diagram illustrating a configuration of a message reception notifying system according to at least one example embodiment, and FIG. 3 is a flowchart illustrating a message reception notifying method according to at least one example embodiment.

Referring to FIG. 2, the message reception notifying system 100 includes a processor 210, a bus 220, a network interface 230, a memory 240, and a database 250. The memory 240 includes an operating system (OS) 241 and a notification providing routine 242. The processor 210 includes a determiner 211 and a provider 212. According to other example embodiments, the message reception notifying system 100 may include a greater or lesser number of constituent elements than the number of constituent elements shown in FIG. 2. However, there is no need to clearly illustrate many constituent elements according to the related art. For example, the message reception notifying system 100 may include other constituent elements, such as a display, a transceiver, etc.

The memory 240 may include a permanent mass storage device, such as random access memory (RAM), read only memory (ROM), a disk drive, etc., as a computer-readable storage medium. Also, program codes (e.g., computer-readable instructions) for the OS 241 and the notification providing routine 242 may be stored in the memory 240. Such software constituent elements may be loaded from another computer-readable storage medium separate from the memory 240 using a drive mechanism (not shown). The other computer-readable storage medium may include, for example, a floppy drive, a disk, a tape, a DVD/CD-ROM drive, a memory card, etc. Software constituent elements may be loaded to the memory 240 through the network interface 230 instead of, or in addition to, the computer-readable storage medium.

The bus 220 enables communication and data transmission between the constituent elements of the message reception notifying system 100. The bus 220 may be configured using a high-speed serial bus, a parallel bus, a storage area network (SAN), and/or another appropriate communication technology.

The network interface 230 may be a computer hardware element for connecting the message reception notifying system 100 to the computer network. The network interface 230 may connect the message reception notifying system 100 to the computer network through a wireless and/or wired connection.

The database 250 serves to store and maintain any information required to provide a message reception notification function. The database 250 may store messages sent from and received by a user. Here, the messages stored in the database 250 may include time information and may be managed in a form of a timeline. Further, the stored messages may be classified and thereby managed based on a date, a counter party (sender/recipient), and the like. In particular, the database 250 may include notification information about a received message. The notification information may include time information as a notification message notifying a reception of a message. That is, notification information about a received message, for example, a message unread by the user may be accumulated in the database 250. Such notification information stored in the database 250 may be managed based on time information. The database 250 may include code information used to configure a frame or a template of a notification window predefined for each message type, a UI for each frame, etc. Also, the database 250 may further include a predefined reply message template and the like as a quick reply function to the received message.

Although FIG. 2 illustrates that the database 250 is included in the message reception notifying system 100, it is an example only. Thus, the database 250 may be omitted based on a system configuration method, an environment, etc. Alternatively, an entire database or a portion of the database may be preset as an external database constructed on a separate system. Additionally, the database 250 may be configured as a local database that is included in an application installed on the user terminal 101.

The processor 210 may be configured to process computer-readable instructions of a computer program by performing a basic arithmetic operation, a logic operation, and an input/output operation of the message reception notifying system 100. The computer-readable instructions may be provided from the memory 240 and/or the network interface 230 to the processor 210 through the bus 220. The processor 210 may be configured to execute program codes for the determiner 211 and the provider 212. The program codes may be stored in a storage device, such as the memory 240.

The determiner 211 and the provider 212, as units of the processor 201, may be configured to perform operations 310 and 320 of FIG. 3.

In operation 310, once a message is received at a user terminal, the determiner 211 determines the type of the received message by reading and parsing the received message. The determiner 211 may classify the type of the received message based on a rule predefined for each message type by parsing content of the message. For example, the determiner 211 may classify the type of a received message into a smishing message by determining whether a file download link, for example, a universal resource locator (URL) at which APK is downloaded, etc., is included in a message, whether a file to be downloaded is included in a malicious code database, and the like. As another example, the determiner 211 may classify the type of a received message into an authentication request message by determining whether an authentication number or an approval number is included in a message. As another example, the determiner may classify the type of a received message by determining whether sender information, for example, a sender number, a sender name, etc., of the message is included in predefined management target information. Here, the sender information may be content directly included in the message or may be content identified at the user terminal from the received message. For example, the determiner 211 may classify the type of a received message into a finance related message based on whether a sender telephone number is included in a financial database, for example, a database in which telephone numbers of financial companies to be managed are stored. Here, if the received message is classified, for example, as a finance related message, the determiner 211 may classify the type of the finance related message into a payment confirmation message based on whether card payment details are included in message content, a payment due message based on whether payment due information is included in the message content, or a deposit/withdrawal confirmation message based on whether banking translation details are included in the message content. As another example, the determiner 211 may classify the type of a received message as a spam message by determining whether a predetermined (or, alternatively, desired) phrase or keyword is included in the message. In detail, the determiner 211 may classify the type of a received message into an advertising message based on whether an advertising phrase is included in message content, a delivery related message based on whether a delivery related keyword, for example, a delivery, an invoice number, a shipment, a deliver, etc., is included in the message content, or a spam message based on whether a predefined spam related keyword, for example, a loan, a proxy driving, an interest rate, etc., is included in the message content.

The determiner 211 may determine the type of a received message by applying at least one of the aforementioned message identification methods. In addition, a variety of criteria for determining a message type within the known art may be additionally applicable.

In operation 320, the provider 212 provides a notification window corresponding to the determined type of the received message to the user terminal 101 in a popup form. A frame or a template for configuring a notification window may be defined to be different based on the message type. The provider 212 may determine a frame corresponding to the type of the received message among frames predefined for the respective message types and may configure and provide a notification window for the received message using the determined frame. That is, the provider 211 may process a message based on a frame corresponding to a message type, and may create and provide a different format of a notification window based on the message type. The notification window may be configured using a frame in different color based on the message type. A frame may be differently defined for each message type based on a variety of display attributes, such as a size, a shape, etc., of a frame, in addition to the color.

According to example embodiments, a UI included in a notification window may be differently configured based on the type of the received message. By considering actions that have user needs based on content of a message, it is possible to define an action button to be included in a notification window based on the message type and to flexibly configure an action button of a notification window for each message type. The provider 212 may provide an environment that allows an immediate access to another function in conjunction with another application through a notification window. For example, the provider 212 may configure a UI for calling an itinerary application in an action button included in a notification window and may provide an access route to an itinerary function. The itinerary function is provided as an example only and an additional function may be used or expanded based on needs of an action associated with a message.

Also, as a different type of message reception notification, the provider 212 may provide, for example, display notification information about the received message in a banner form on a UI screen associated with a message box. Here, the message box may be a storage box configured autonomously at a message app as a unit of a message management environment, such as store, sort, check, delete, etc., of a message, or may be a storage box included on a messaging application of an entity that substantially sends and receives a message. The provider 212 may provide a notification center for separately managing notification information about a received message, separate from the message box, and may provide a notification message for the received message through the notification center as another type of message reception notification. That is, the provider 212 may provide a message reception notifying space by configuring the notification center using the notification message for the received message.

The provider 212 may provide additional information associated with the received message at one or more locations adjacent to a notification window together with the notification window for the received message. For example, the provider 212 may display a sum of credit card bills during an aggregation period, a recent credit card purchase item, a transaction period of the credit card, an event guide associated with the credit card, etc., at a lower end of a corresponding notification window when displaying a notification window for a payment confirmation message.

Figure 4:
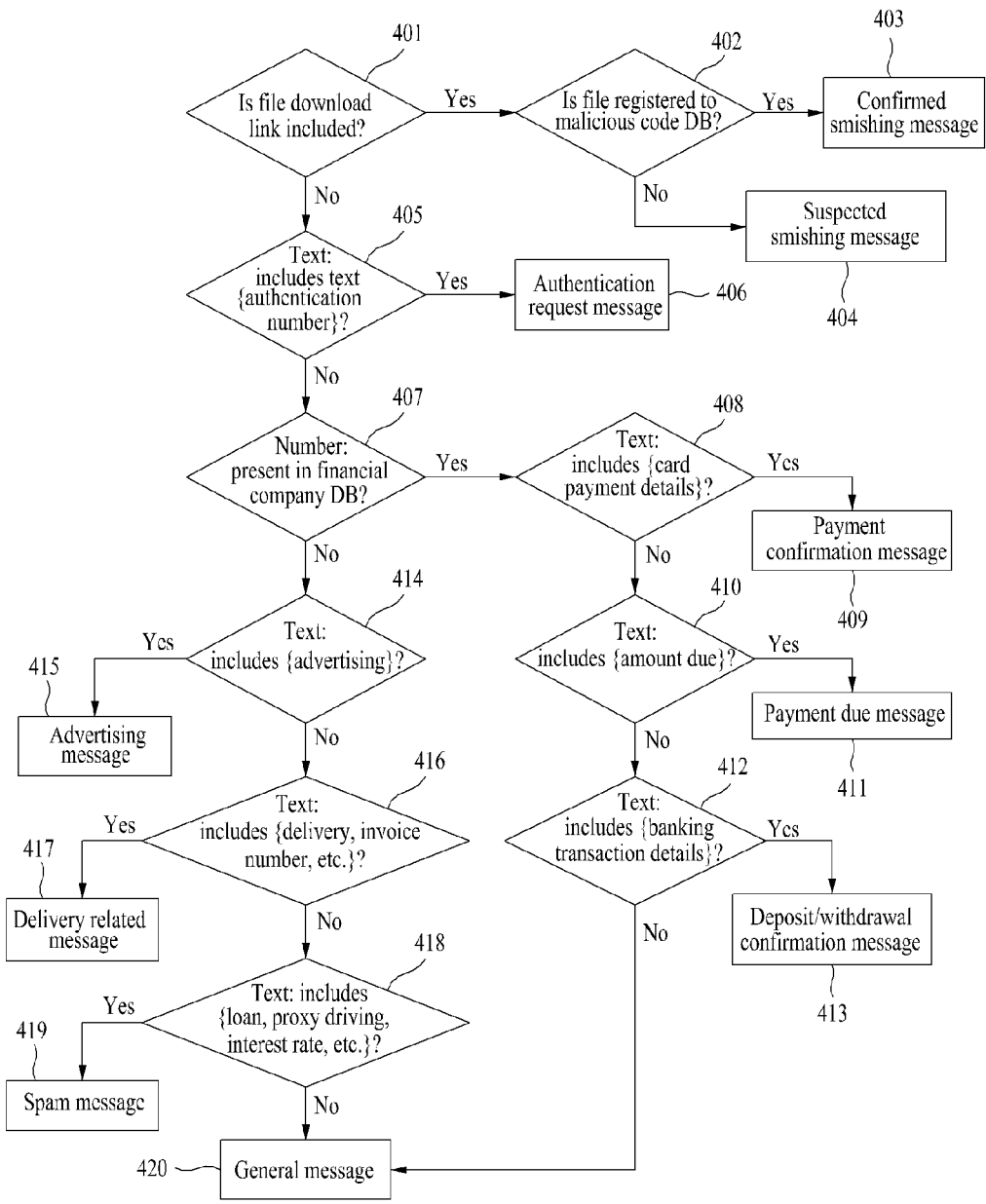
FIG. 4 is a flowchart illustrating a process of determining a message type according to at least one example embodiment.

FIG. 4 is a flowchart illustrating a process of determining a message type according to at least one example embodiment. Operations of FIG. 4 may be performed at the determiner 211 of FIG. 2.

Referring to FIG. 4, in operation 401, the determiner 211 determines whether a received message includes a file download link, for example, a URL at which APK is downloaded, etc.

In operations 402 through 404, when the received message includes the file download link, the determiner 211 determines the type of the received message as a smishing message. For example, it is possible to manage a file that includes a malicious code by constructing a malicious code database in advance. In operation 402, the determiner 211 determines whether a file, for example, APK, etc., to be downloaded through the file download link is registered to the malicious code database. In operation 403, when the file is registered to the malicious code database, the determiner 211 determines the file as a certain smishing message, for example, a confirmed smishing message. In operation 404, when the file is not registered to the malicious code database, however, the determiner 211 determines the received file as a message suspected for smishing, for example, a suspected smishing message, based on a probability that the received message may be a smishing message. As another example, when the received message includes a file download link that automatically downloads a file, the determiner 211 may determine the received message as an unconditional smishing message.

In operation 405, when the received message does not include a file download link, the determiner 211 determines whether a text of the received message includes an authentication number or an approval number.

In operation 406, when the text of the received message includes the authentication number or the approval number, the determiner 211 determines a type of the received message as an authentication request message.

In operation 407, when the text of the received message does not include an authentication number or an approval number, the determiner 211 determines whether a sender number of the received message is present in a financial company telephone number database.

In operation 408, when the sender number of the received message is present in the financial company telephone number database, the determiner 211 determines whether the text of the received message includes card payment details, for example, a payment amount, etc.

In operation 409, when the text of the received message includes card payment details, the determiner 211 determines a type of the received message as a payment confirmation message.

In operation 410, when the text of the received message does not include card payment details, the determiner 211 determines whether the text of the received message includes payment due information, for example, an amount due, etc.

In operation 411, when the text of the received message includes payment due information, the determiner 211 determines the type of the received message as a payment due message.

Although it is described that the payment confirmation message and the payment due message are classified into different types of messages, it is only an example. The payment confirmation message and the payment due message may be classified into the same type of messages.

In operation 412, when the text of the received message does not include card payment details, the determiner 211 determines whether the text of the received message includes banking transaction details, for example, a deposit amount, a withdrawal amount, and the like.

In operation 413, when the text of the received message includes banking transaction details, the determiner 211 determines the type of the received message as a deposit/withdrawal confirmation message.

In operation 414, when a sender number of the received message is absent in the financial company telephone number database, the determiner 211 determines whether the text of the received message includes a specific keyword, for example, advertising.

In operation 415, when the text of the received message includes an advertising phrase, the determiner 211 determines the type of the received message as an advertising message.

In operation 416, when the text of the received message does not include the advertising phrase, the determiner 211 determines whether the text of the received message includes a delivery related keyword, for example, a delivery, an invoice number, a shipment, a deliver, etc.

In operation 417, when the text of the received message includes the delivery related keyword, the determiner 211 determines the type of the received message as a delivery related message.

In operation 418, when the text of the received message does not include the delivery related keyword, the determiner 211 determines whether the text of the received message includes a keyword specified for identifying a spam message (hereinafter, a spam related keyword), for example, a loan, a proxy driving, an interest rate, etc.

In operation 419, when the text of the received message includes the spam related keyword, the determiner 211 determines the type of the received message as a spam message. That is, the determiner 211 may filter a text that includes a keyword, such as a loan, a proxy driving, an interest rate, etc., as a spam among received messages and then may process the text as a spam message based on a spam index.

In operation 420, when the received message does not correspond to one of a smishing message, an authentication request message, a payment confirmation message, a payment due message, a deposit/withdrawal confirmation message, an advertising message, a delivery related message, and a spam message, the determiner 211 classifies, that is, determines the received message as a general message.

A general message may be classified into two or more types based on the type of an originating number. For example, a received message determined as a general message may be classified as a message of which an originating number is a mobile phone number and a message of which an originating number is a general telephone number. That is, for the received message determined as the general message, a notification window in a different format may be provided based on the type of an originating number, for example, a mobile phone number, a general telephone number, etc.

The message types described with FIG. 4 are provided as examples only and a message type classifiable through message parsing may be additionally applicable. The process of determining a message type is also provided as an example. Thus, additional operations may be further included based on a predefined message type, and orders or locations of the operations may be changed.

The provider 212 may provide a notification window in a popup form on the display screen of the user terminal 101 as a notification of the received message. Here, the frame or the template of the notification window and a UI, for example, an action button, may be configured to be differentiated based on the type of the received message.

The provider 212 may process the received message and may display at least a portion of content of the received message (hereinafter, message content). Here, the notification window may be configured so that the message content is represented commonly based on a minimum length, for example, 1 line, and a maximum length, for example, 4 lines, regardless of the message type and is processed using a scroll if the message content exceeds the maximum length. The notification window may be configured to land on a detail page of the received message in response to a selection, for example, a touch, a click, etc., on message content that is a main text area displayed on the notification window.

Sender information may be displayed on the notification window together with the message description. Here, the sender information may include at least one of a profile image, a name, and a telephone number. If a message originating number is registered to an address book of the user terminal 101, an image, a name, a number, etc., stored in the address book may be used. If the message originating number is not registered to the address book, an image, a name, a number, etc., stored in a database on the interworking Internet may be used.

The notification window may include at least one action button as a UI for the received message, and may include action buttons, such as a delete button, a close button, a block button, a copy button, a quick reply button, an itinerary register button, a tag add button, a report view button, a recent detail view button, etc. Based on the message type, action buttons of the notification window may be flexibly configured.

The action buttons may be defined as follows:

A delete button is configured as a function of immediately deleting a received message.

A close button is configured as a function of processing a message to be read or subtracting badge counts of the corresponding message by one.

A block button is configured as a function of moving a received message to a blocked message box by blocking the received message and at the same time, adding a sender number of the received message to a reception block database.

A copy button is configured as a function of automatically saving at least a portion of content, for example, an authentication number, of a received message on a clipboard.

A quick reply button is configured as a function of landing on a message thread, providing a common phrase card list, and immediately sending a message selected from the common phrase card list as a reply to a received message.

An itinerary register button is configured as a function of calling an itinerary application to register an itinerary associated with a received message and landing on a calendar alternatives and edition screen.

A tag add button is configured as a function of adding a variety of tags, such as location information, friend information, etc., to a received message.

A report view button and a recent detail view button are configured as a function of providing accumulated information based on messages included in a bundle to which a received message belongs. Here, the bundle indicates a grouping unit for classifying the same subject or same type of messages or messages sent from the same sender.

An advertising block button is configured as a function of moving a received message to an advertising message box by blocking the received message and at the same time, adding a sender number of the received message to a reception block database.

A delivery reference button is configured as a function of landing on a delivery reference page through a link included in a received message.

A replay button is configured as a function of displaying a notification of a received message again after a preset period of time is elapsed. For example, in response to selecting the replay button configured on a notification window for a message reception, a time list, such as 30 minutes, 1 hour, 2 hours, etc., may be displayed. In this example, if a user selects a specific time from the time list, the notification window for the corresponding message may be displayed again after a period of time selected by the user is elapsed. The replay button may include a function of repeatedly displaying a notification window for a corresponding message at time intervals selected by the user.

If a notification window for a received message is described to be configured using a button defined based on a message type, it is only an example. The notification window may be configured by selecting a user desired button based on user settings.

Figure 5:
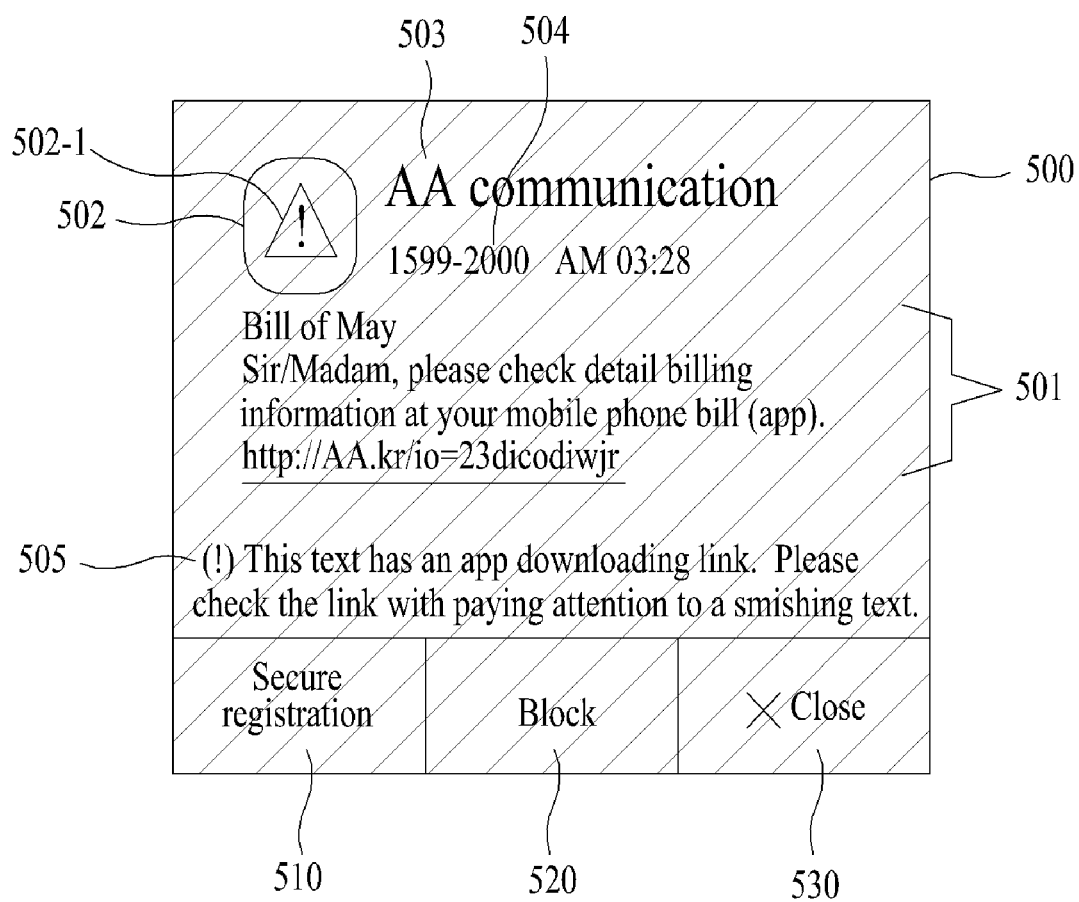
FIGS. 5-8, 9A, 9B, 10 through 16 illustrate examples of a user interface (UI) screen associated with notifying a reception of a message according to at least one example embodiment.

FIG. 5 illustrates an example of a smishing message notification window 500 for notifying a reception of a smishing message according to at least one example embodiment.

Referring to FIG. 5, the smishing message notification window 500 may include message content 501 and sender information. Here, the sender information may include a profile image 502, a name 503, a telephone number 504, etc. In the case of a smishing message, an image 502-1 indicating a smishing risk may be applied to the profile image 502. In addition, the smishing message notification window 500 may further include an alerting text 505 that calls the user's attention to smishing. Here, the smishing message may be classified into a confirmed smishing message and a suspected smishing message. The alerting text 505 may include different phrases indicating a confirmed smishing message and a suspected smishing message, respectively, with respect to the smishing message. For example, in the case of the confirmed smishing message, a phrase saying "please do not download this message, it includes a malicious code!" may be displayed. In the case of the suspected smishing message, a phrase saying "please pay attention, this file may be risky!" may be displayed.

The smishing message notification window 500 may include a secure register button 510, a block button 520, a close button 530, etc., as UIs associated with the smishing message. Here, the secure register button 510 is configured as a function of excluding a corresponding message from a target to be classified as a smishing message. For example, in response to selecting the secure register button 510 on the smishing message notification window 500, at least one of a sender telephone number of a corresponding message and link information included in the message may be added to an excluded smishing target database, and a message including the same telephone number or link information may not be classified as a smishing message.

Figure 6:
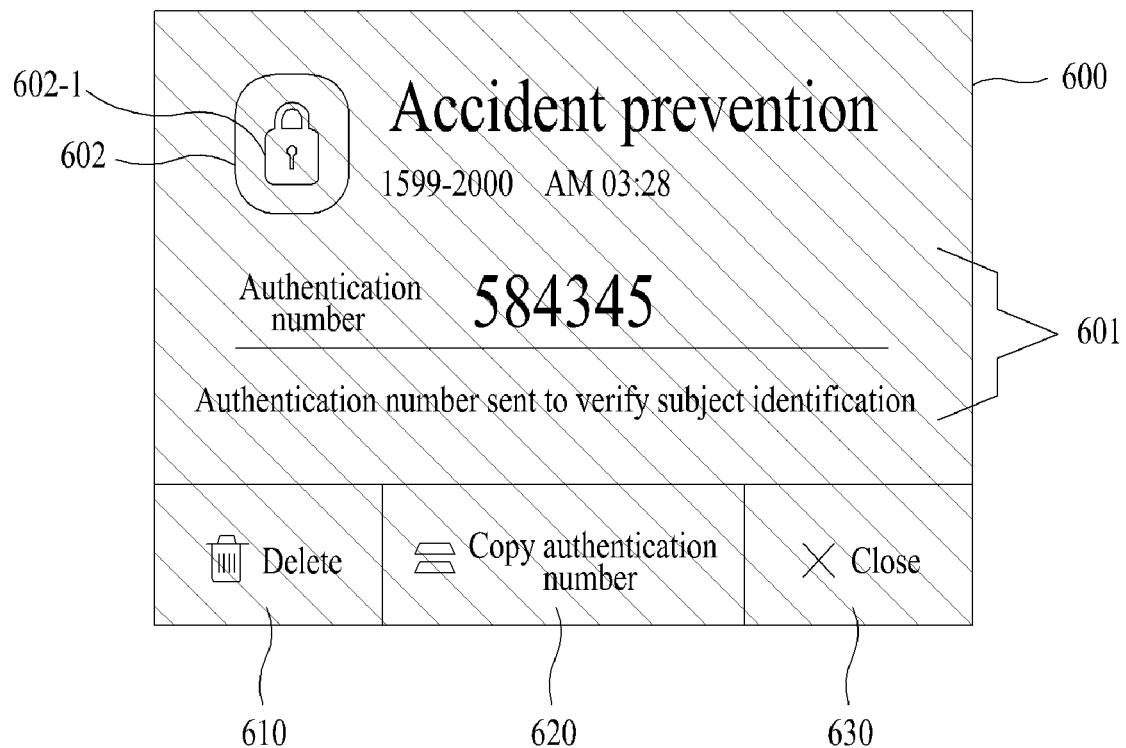

FIG. 6 illustrates an example of an authentication message notification window 600 for notifying a reception of an authentication message according to at least one example embodiment.

Referring to FIG. 6, the authentication message notification window 600 may include message content 601 and sender information. Here, the sender information may include a profile image 602, a name, a telephone number, etc. In the case of an authentication message, an image 602-1 indicating authentication transaction information may be applied to the profile image. A database in which a telephone number and a name are matched may be predefined. A name corresponding to a message originating number may be retrieved from the database and may be displayed as the sender information.

In the message content 601, an authentication number extracted by parsing an authentication request message may be highlighted. If the authentication number includes a preset (or, alternatively, desired) number of digits, for example, five or more digits, the digits of the authentication number may be grouped by each two digits and each group may be represented in different color. Here, if the authentication number includes odd digits, a last group may be represented to have one more digit.

The authentication message notification window 600 may include a delete button 610, a copy button 620, a close button 630, etc., as UIs associated with the authentication request message. Here, the copy button 620 is configured as a function of copying an authentication number included in the message content 601. In response to selecting the copy button 620 on the authentication message notification window 600, a number parsed as an authentication number from the authentication request message may be automatically copied to a clipboard.

Figure 7:
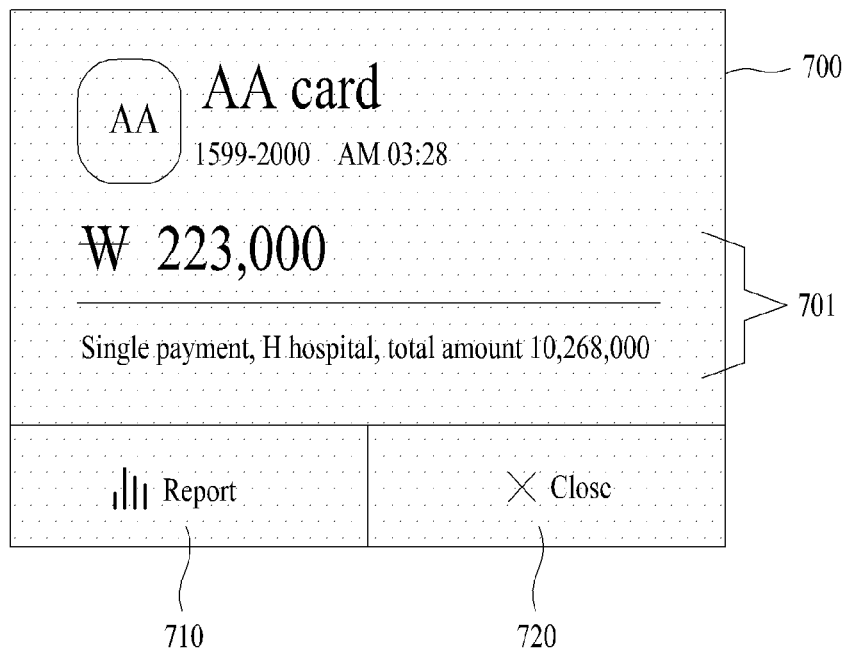

FIG. 7 illustrates an example of a payment message notification window 700 for notifying a reception of a payment confirmation message according to at least one example embodiment.

Referring to FIG. 7, the payment message notification window 700 may include message content 701 and sender information. Here, the sender information may include a profile image, a name, a telephone number, etc. In the case of a payment confirmation message, a credit card company logo may be applied to the profile image. A database in which a telephone number and a name/logo of a credit card company are matched may be predefined. The name and the logo of a credit card company corresponding to a message originating number may be retrieved from the database and be displayed as the sender information.

The message content 701 may be configured using a different format of content that includes primary information acquired by parsing the payment confirmation message. For example, the message content 701 may be configured to include a payment amount, installation information, a used place, a total amount, etc., which are extracted from the payment confirmation message. In particular, the payment account extracted by parsing the payment confirmation message may be highlighted in the message content 701.

The payment message notification window 700 may include a report button 710, a close button 720, etc., as UIs associated with the payment confirmation message. Here, the report button 710 is configured as a function of landing on a bundle detail page for providing a variety of statistical information about a bundle that includes the payment confirmation message. For example, in response to selecting the report button 710 on the payment message notification window 700, a user may connect to the bundle detail page for providing a monthly card debit, a total amount for each credit card company, etc.

Figure 8:
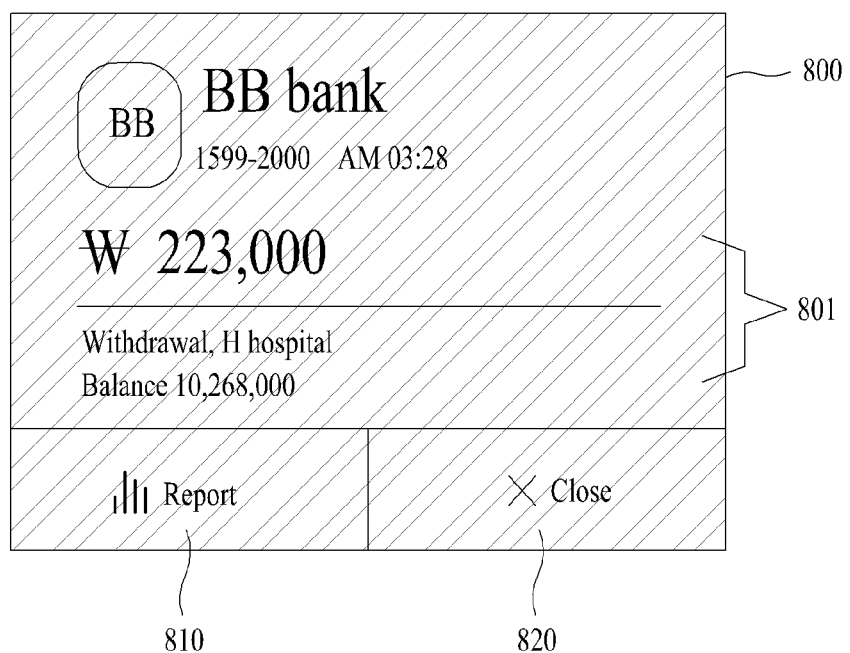

FIG. 8 illustrates an example of a transaction message notification window 800 for notifying a reception of a deposit/withdrawal confirmation message according to at least one example embodiment.

Referring to FIG. 8, the transaction message notification window 800 may include message content 801 and sender information. Here, the sender information may include a profile image, a name, a telephone number, etc. In the case of a deposit/withdrawal confirmation message, a logo of a bank may be applied to the profile image. A database in which the telephone number and the name/logo of a bank are matched may be predefined. The name/logo of a bank corresponding to a message originating number may be retrieved from the database and be displayed as the sender information.

The message content 801 may be configured using a different format of content that includes primary information acquired by parsing the deposit/withdrawal confirmation message. For example, the message content 801 may be configured to include a deposit amount/withdrawal amount, a sender/recipient, balance, etc., which are extracted from the deposit/withdrawal confirmation message. In particular, the deposit amount/withdrawal amount extracted by parsing the deposit/withdrawal confirmation message may be highlighted in the message content 801.

The transaction message notification window 800 may include a report button 810, a close button 820, etc., as UIs associated with the deposit/withdrawal confirmation message. Here, the report button 810 is configured as a function of landing on a bundle detail page for providing a variety of statistical information about a bundle that includes the deposit/withdrawal confirmation message. For example, in response to selecting the report button 810 on the transaction message notification window 800, a user may connect to the bundle detail page for providing a monthly transaction amount (a total deposit/withdrawal amount), a transaction amount (a total deposit/withdrawal amount) for each bank, balance, etc.

As described above, a financial company may be classified into a credit card company and a bank based on the type of transaction. The credit card company may be classified into a consumer credit card, a corporate card, a check card, etc. Accordingly, a notification window may be configured by processing a message received from the financial company to be in a format corresponding to the type of transaction. For example, in the case of a consumer credit card/corporate card, a place of use, a payment amount, a type of payment (single payment/installment), a total amount or limit balance, a card name, etc., may be displayed. In the case of a check card, a place of use, a payment amount, a type of payment, balance (remaining limit), a card name, etc., may be displayed. In the case of a bank, a type of transaction (deposit/withdrawal/withdrawal cancel), a used place, a transaction amount, balance, etc., may be displayed.

Figure 9A:
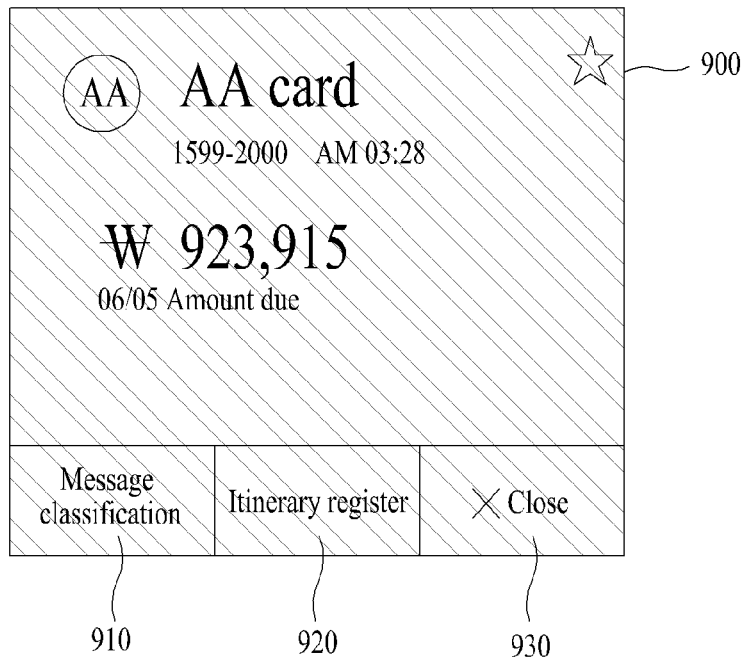
Figure 9B:
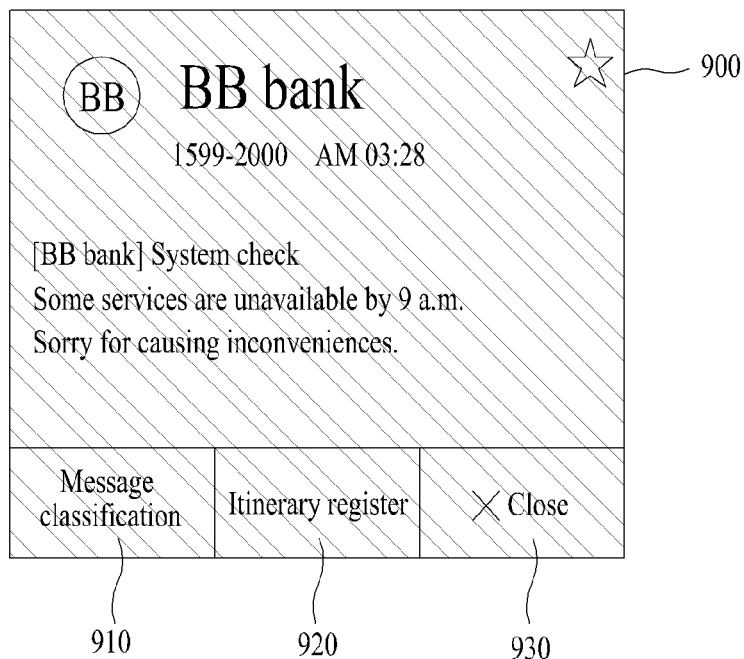

If a message originating telephone number is present in a financial company telephone database and a text of a message does not include card payment details or banking transaction details, the corresponding message may be classified as a general message. Referring to FIGS. 9A and 9B, in the case of a general message that includes content, such as a public notification (FIG. 9B) or an amount due (FIG. 9A), etc., in a message received from a financial company, a message reception notification window 900 may include a message classification button 910, an itinerary register button 920, a close button 930, etc., as UIs associated with the received message. Here, the message classification button 910 is configured as a function of changing a message type, and may classify the type of the received message into a payment confirmation message or a deposit/withdrawal confirmation message, rather than the general message. The itinerary register button 920 is configured as a function of landing on a calendar alternatives and itinerary edition screen by calling an application set to register an itinerary associated with the received message.

Although it is described that a message including an amount due is classified as a general message, the message including an amount due may be classified into a payment due message that is another message type of FIG. 4, rather than the general message. In this case, similar to the payment confirmation message or the deposit/withdrawal confirmation message, a UI that includes a report button, a close button, etc., may be configured on a message notification window.

Figure 10:
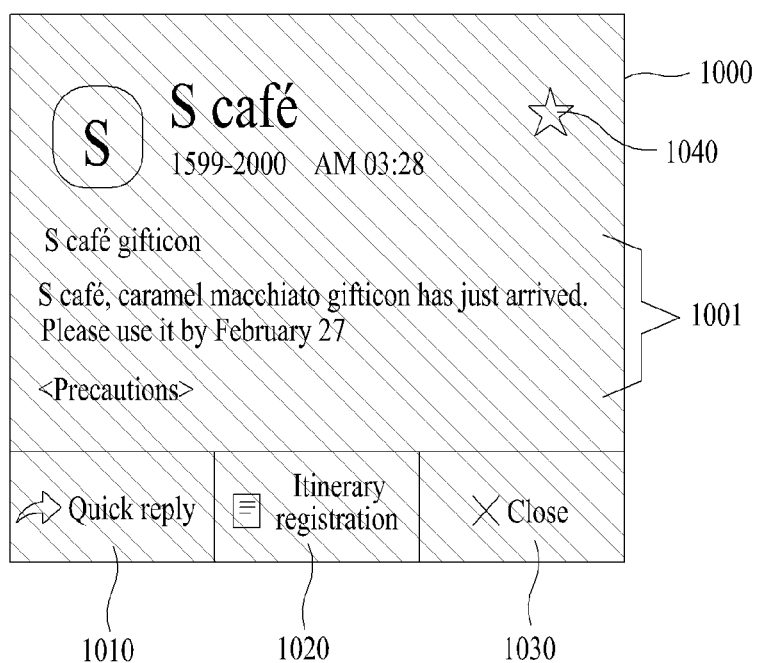

FIG. 10 illustrates an example of a general message notification window 1000 for notifying a reception of a general message according to at least one example embodiment.

Referring to FIG. 10, the general message notification window 1000 may include message content 1001 and sender information. Here, the sender information may include a profile image, a name, a telephone number, etc. If a message originating number is registered to an address book, sender information may be displayed using an image, a name, a number, etc., stored in the address book. If the message originating number is not registered to the address book, sender information may be displayed using an image, a name, a number, etc., stored in a database that interworks with the Internet.

At least a portion of the content of the text included in the received message may be indicated on the message content 1001 by processing the received message.

The general message notification window 1000 may include a quick reply button 1010, an itinerary register button 1020, a close button 1030, a bookmark button 1040, etc., as UIs associated with the general message.

The itinerary register button 1020 is configured as a function of calling an itinerary application to register an itinerary associated with the received message and landing on a calendar alternatives and itinerary edition screen. In response to selecting the itinerary register button 1020 on the general message notification window 1000, content parsed from the received message may be automatically transferred as an input element, for example, an itinerary name, a date, a place, etc. For example, the title of a message may be transferred to the itinerary application to be designated as an itinerary name. Corresponding date information may be transferred to the itinerary application to designate, as an itinerary registration date, a specific date if the specific date is included in a text of a message, a last date in content expressed as '~', by, etc., if a date range is included in the text of the message, or a message received date if a date is not included in the text of the message.

The bookmark button 1040 is configured as a function of setting a bookmark to a received message and classifying the received message as an important message. In response to selecting the bookmark button 1040 on the general message notification window 1000, a corresponding message may be registered to a timeline may be registered and an icon, for example, a star indicating importance may be marked at the corresponding message in a message list, such as a message box and the like.

Figure 11:
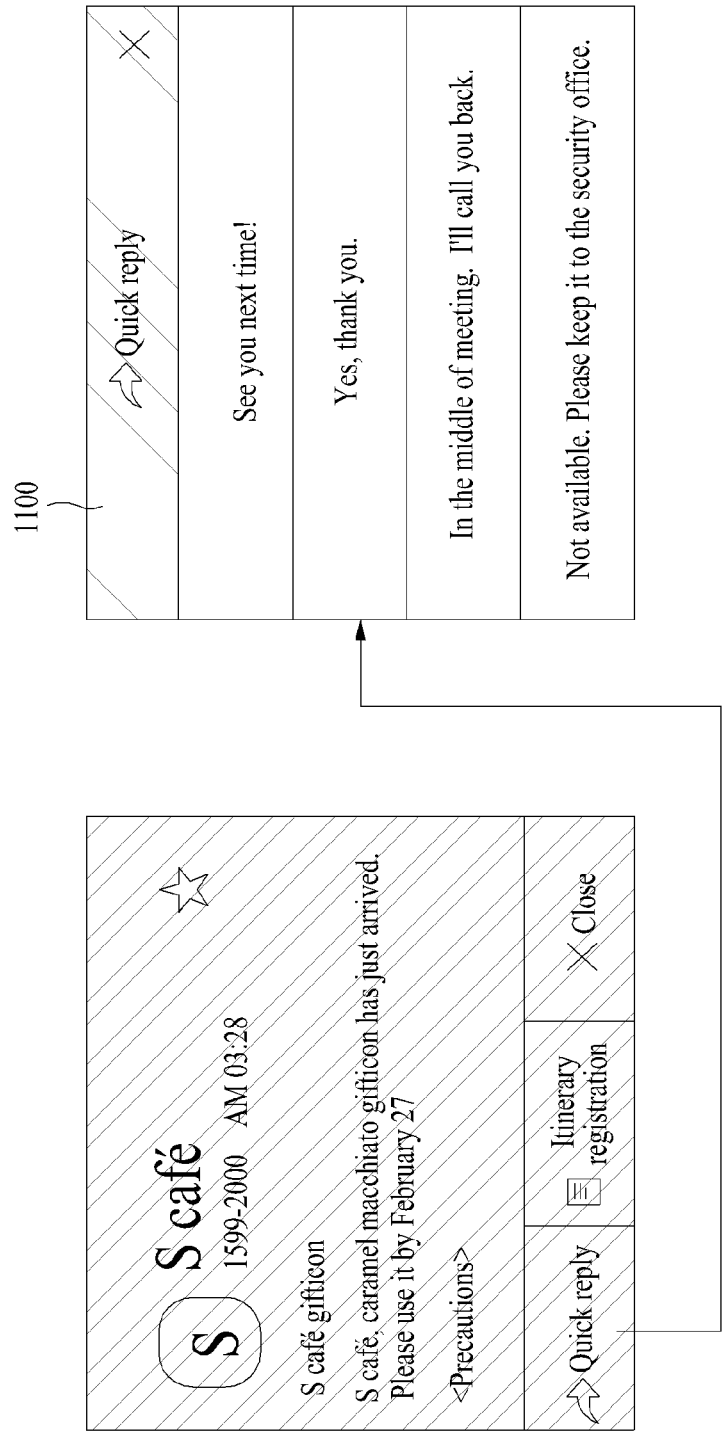

The quick reply button 1010 is configured as a function of providing a common phrase card list and immediately sending a message selected from the common phrase card list as a reply to a received message. Here, the common phrase card list may include phrases arbitrarily registered on a service. Also, the common phrase card list may be provided by reading messages sent from a user and by automatically selecting and registering phrases frequently used by the user. Referring to FIG. 11, in response to selecting the quick reply button 1010 on the general message notification window 1000 of FIG. 10, a common phrase card list 1100 may be displayed in a popup form. In response to a user selection on a single card from the common phrase card list 1100, a common phrase of the selected card may be transferred as a reply to a received message. If only a single common phrase card is present, a phrase determined for the card may be immediately transferred as a reply to the received message without popping up the common phrase card list 1100. Here, the common phrase card list 1100 may be set to a default or may be configured using common phrases input from the user.

In the case of a general message, a different format of a notification window may be provided based on the type of an originating number, for example, a mobile phone number, a general telephone number, etc. If an originating number of a received message is a mobile phone number, the quick reply button 1010 may be included on the general message notification window 1000. If the originating number of the received message is a general telephone number, for example, a landline number, a reply cannot be made and thus, a replay button may be included on the general message notification window 1000 instead of the quick reply button 1010. The replay button is configured as a function of displaying a notification of a received message after a preset period of time is elapsed or repeatedly displaying the notification at set time intervals. For example, in response to selecting the replay button on the general message notification window 1000, a time list, such as 30 minutes, 1 hour, 2 hours, etc., may be displayed. In this example, if a user selects a specific time from the time list, a notification window for the corresponding message may be displayed again after a period of time selected by the user is elapsed.

Although not illustrated, a notification window corresponding to an advertising message may include an advertising block button and a notification window corresponding to a spam message may include a spam block button. Here, the advertising block button is configured as a function of moving a received message to an advertising message box by blocking the received message and at the same time, adding an originating telephone number of the message to a reception block database. The spam block button is configured as a function of moving a received message to a blocked message box by blocking the received message and at the same time, adding an originating telephone number of the message to a reception block database. A notification window corresponding to a delivery related message may include a delivery reference button. Here, the delivery reference button is configured as a function of landing on a delivery reference page through a link included in a received message. Also, if an originating number of the delivery related message is a mobile phone number, the notification window may include a quick reply button. The quick reply button is configured as a function of providing a common phrase card list, and immediately sending a message selected from the common phrase card list as a reply to the delivery related message. The common phrase card list for a quick reply associated with delivery may include phrases, for example, 'please keep it at the security office', 'please do not push the bell and just knock on the door', etc., that may be used between a user and a delivery man. The phrases may be arbitrarily registered at a service or may be registered based on user settings.

As described above, a notification window for a received message may be configured to have a different frame and action button based on a message type.

Figure 12:
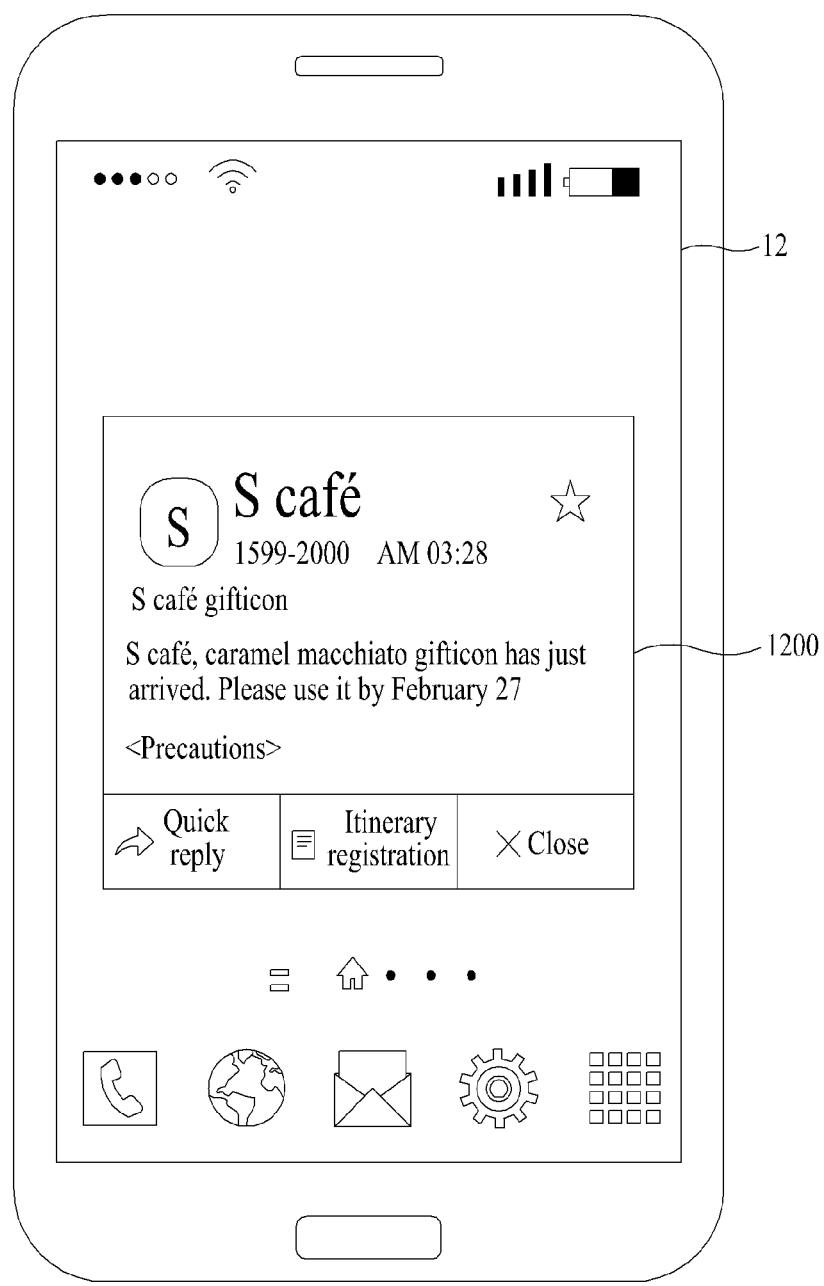

Referring to FIG. 12, in response to a new message being received at the user terminal 101, the provider 212 may display a notification window 1200 including a frame and an action button corresponding to a type of the received message in a popup form on a screen 12 of the user terminal 101.

Figure 13:
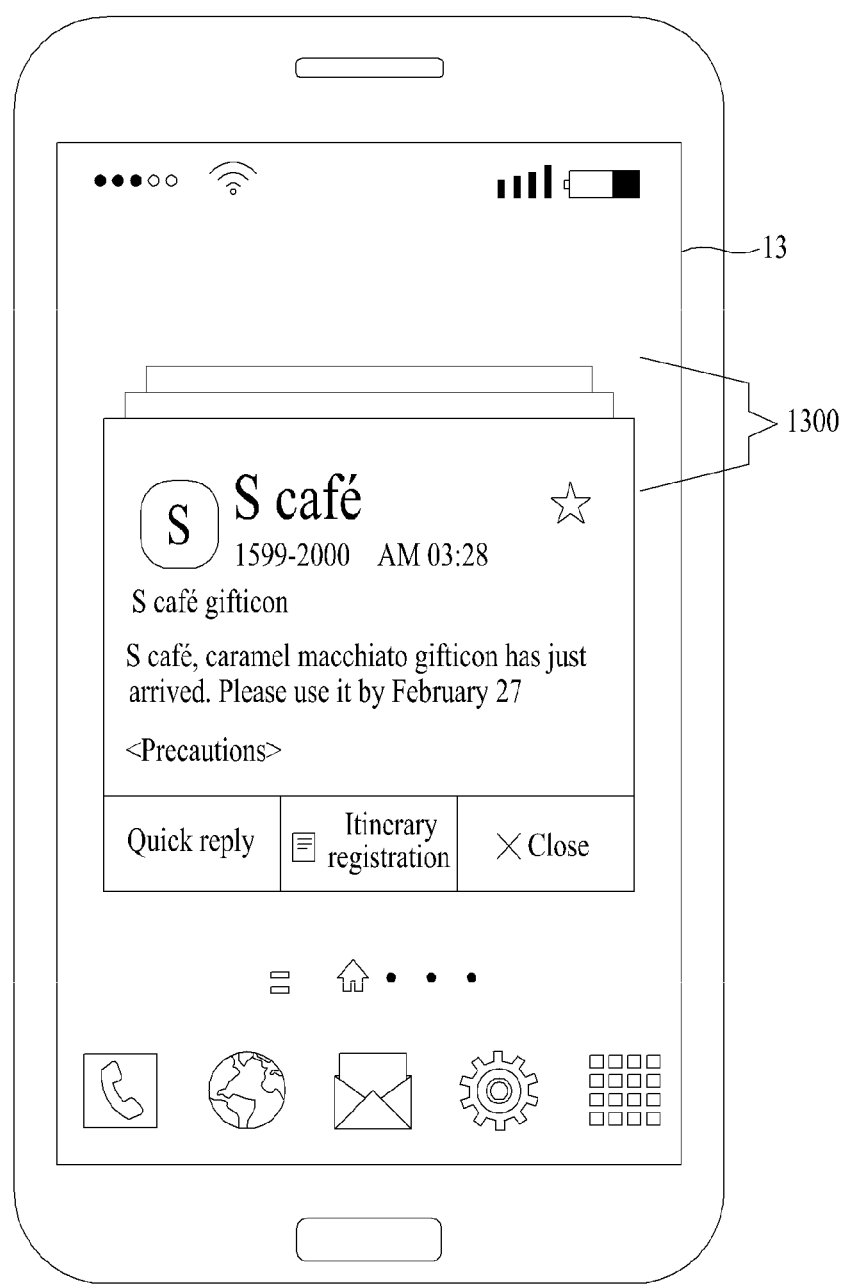

Referring to FIG. 13, if a user does not read a message and message reception notifications are accumulated, message reception notification windows 1300 may be overlappingly displayed on a screen 13 of the user terminal 101. Here, a notification window for a most recent received message may be displayed at the top end and an input of an action may be enabled with respect to the notification window displayed at the top end.

In response to selecting a home button or a back button of the user terminal 101 in a state in which the message reception notification windows 1300 are overlappingly displayed in a popup form, all of the message reception notification windows 1300 may be closed. In this case, a received message may be maintained to be in an unread state and badge counts for received messages may not be altered.

Figure 14:
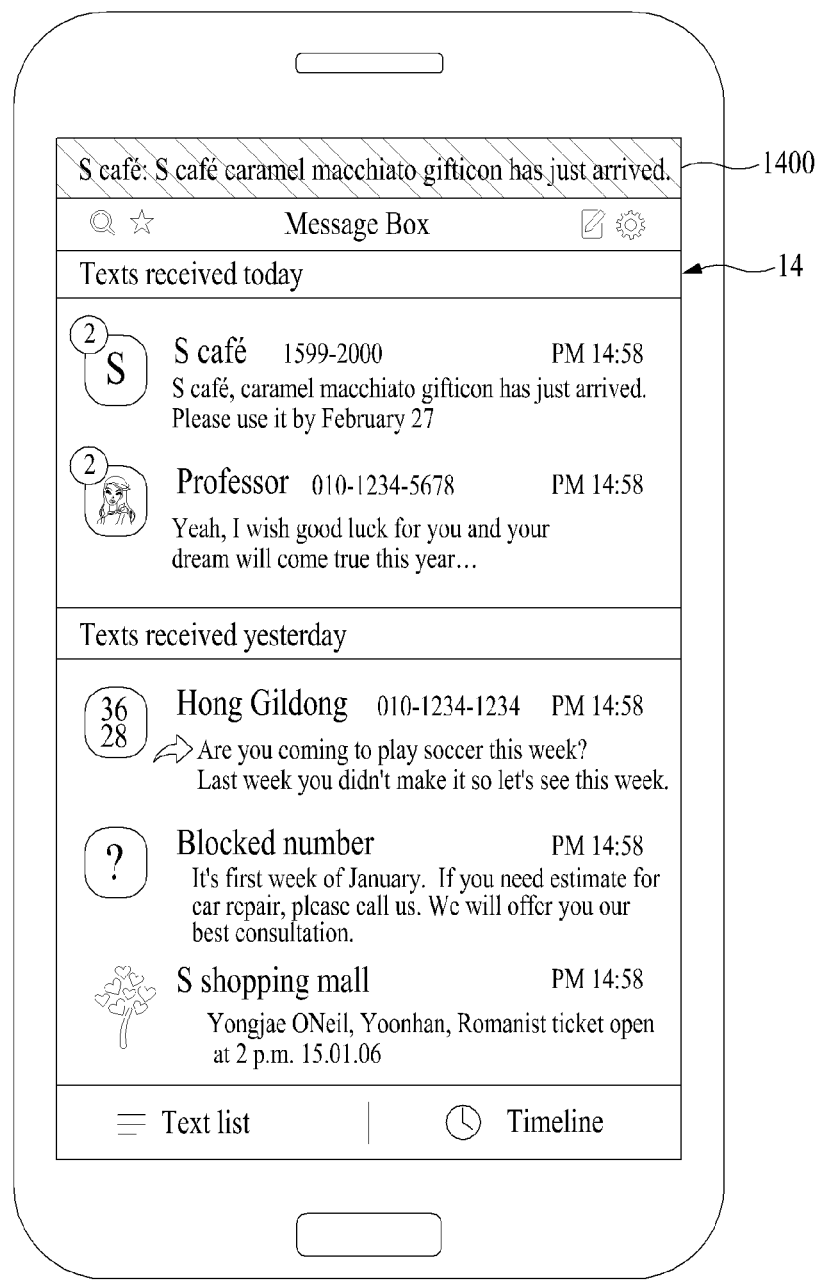

FIG. 14 illustrates a UI screen 14 associated with a message box according to at least one example embodiment.

Referring to FIG. 14, messages stored in the message box may be sorted and displayed on the UI screen 14 based on a preset criterion, for example, based on a time. Here, a notification message (hereinafter, a notification banner) 1400 in a banner form may be displayed as notification information about a received message at one side, for example, an upper end, of the UI screen 14.

For example, the notification banner 1400 may be configured in a single line that includes at least one of sender information, for example, a profile image, a name, and a telephone number, about a received message and message content, and may be displayed on the UI screen 14. The notification banner 1400 may be displayed on the UI screen 14 by applying a scrolling method based on a message length.

A different frame may be applied to the notification banner 1400 based on a message type. For example, a different banner color may be applied based on a message type. The notification banner 1400 may be configured in a different format of content based on the title, the main text, the attachment file, etc., included in the message.

Figure 15:
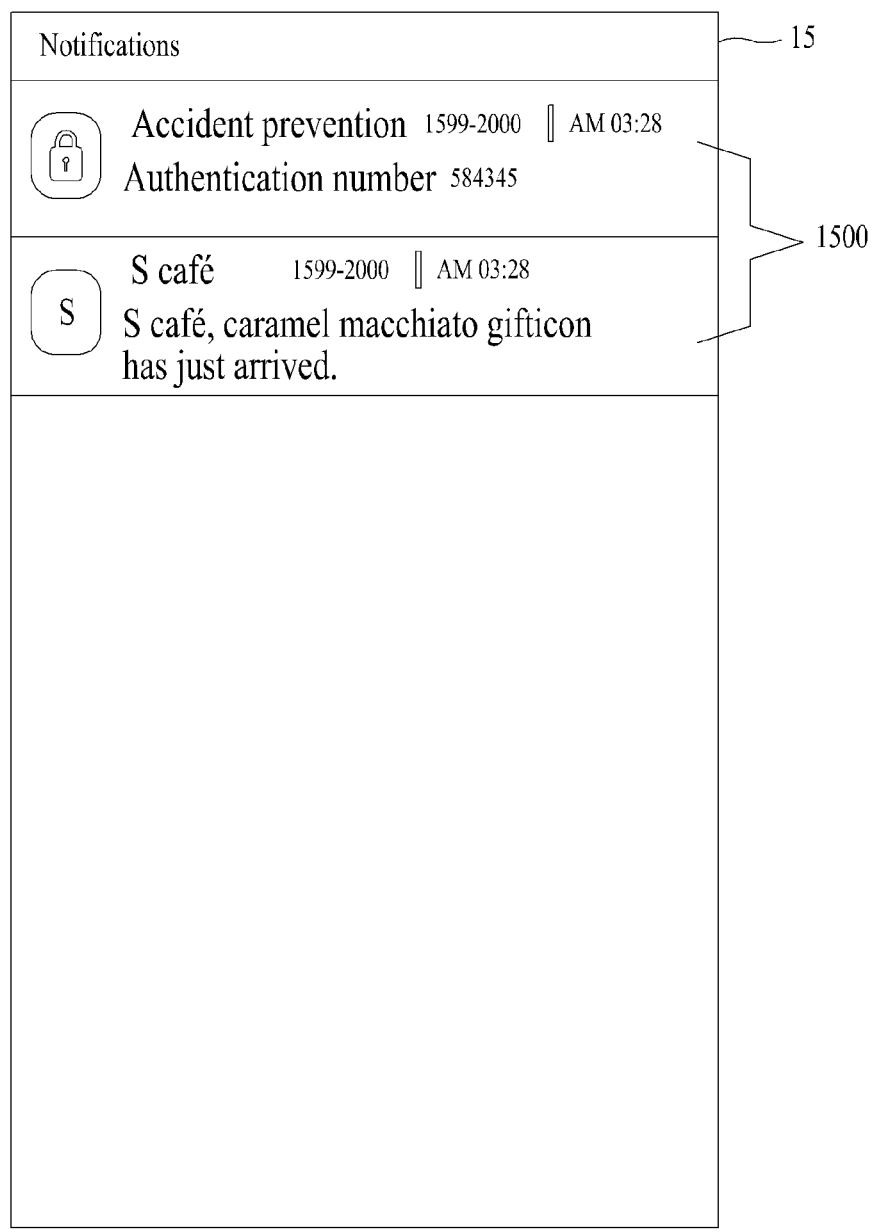

FIG. 15 illustrates a UI screen 15 on the user terminal 101 associated with a notification center according to at least one example embodiment.

Referring to FIG. 15, notification information 1500 of received messages processed to be unread among received messages notified in a popup or banner form on the user screen of the user terminal 101 may be sorted based on a preset criterion, for example, in temporal order and thereby displayed on the UI screen 15 as a management space separate from a message box.

For example, the notification information 1500 may be configured in a card form with respect to each of received messages and may be configured in a predefined format that includes at least one of sender information, for example, a profile image, a name, a telephone number, etc., and message content, and then be displayed as a card list on the UI screen 15.

A different card may be applied to the notification information 1500 based on a message type. For example, a different card color may be applied based on a message type. The notification information 1500 may be configured in a different format of content based on a title, a main text, an attachment file, etc., included in the message.

In response to selecting the notification information 1500 of a specific message on the UI screen 15, a corresponding message card may be expanded so that a full text of the message on the expanded card may be displayed and an action button corresponding to a message type may be displayed on the expanded card.

Figure 16:
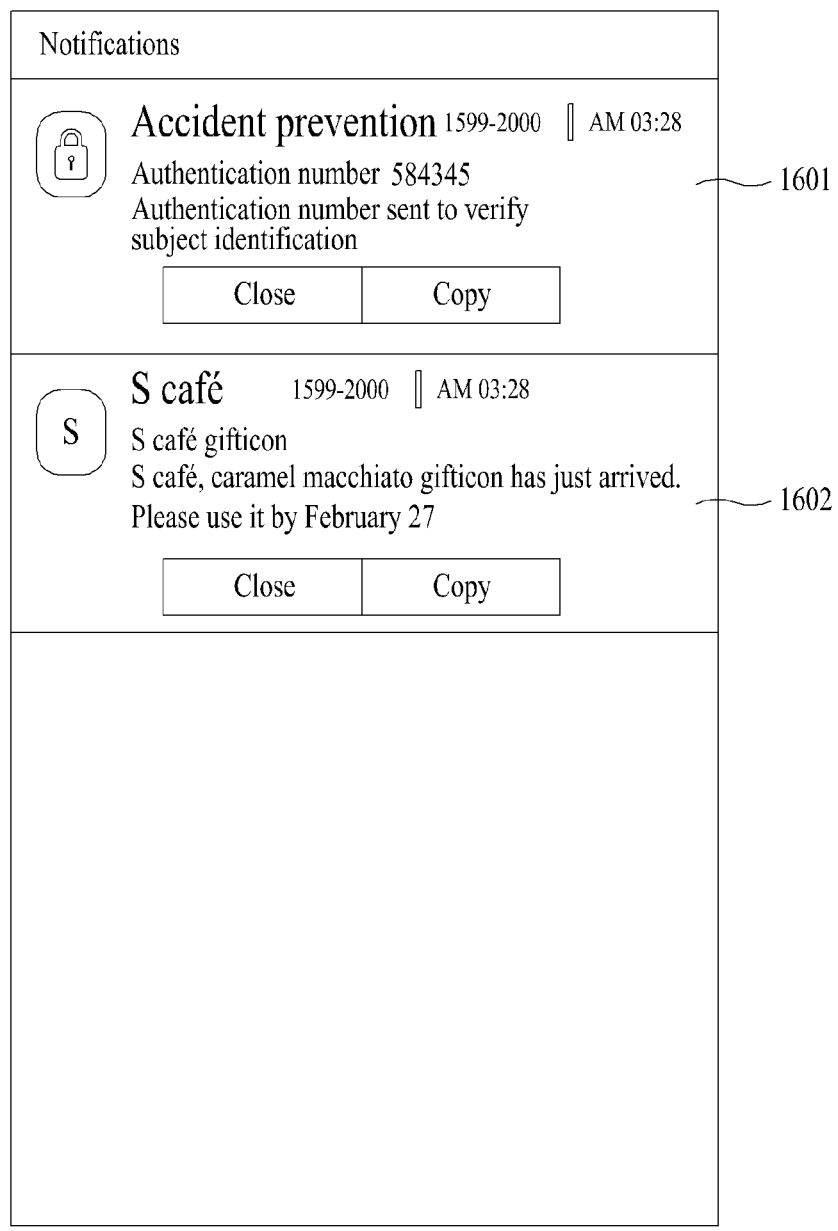

For example, referring to FIG. 16, in the case of a message 1601 classified as an authentication request message, primary content parsed from the message 1601 may be displayed when a corresponding message card is expanded. In particular, a close button for processing a received message to be read, a copy button for copying an authentication number included in a message to a clipboard, etc., may be included as action buttons. In the case of a message 1602 classified as a general message, a full text of the message 1602 may be maximally displayed and a close button for processing a received message to be read, a quick reply button for transferring a reply using a common phrase, etc., may be included as action buttons.

As described above, according to some example embodiments, in the case of providing a message reception notification using a notification banner or a notification center, a different format of notification information may be created and provided based on the message type.

Figure 17:
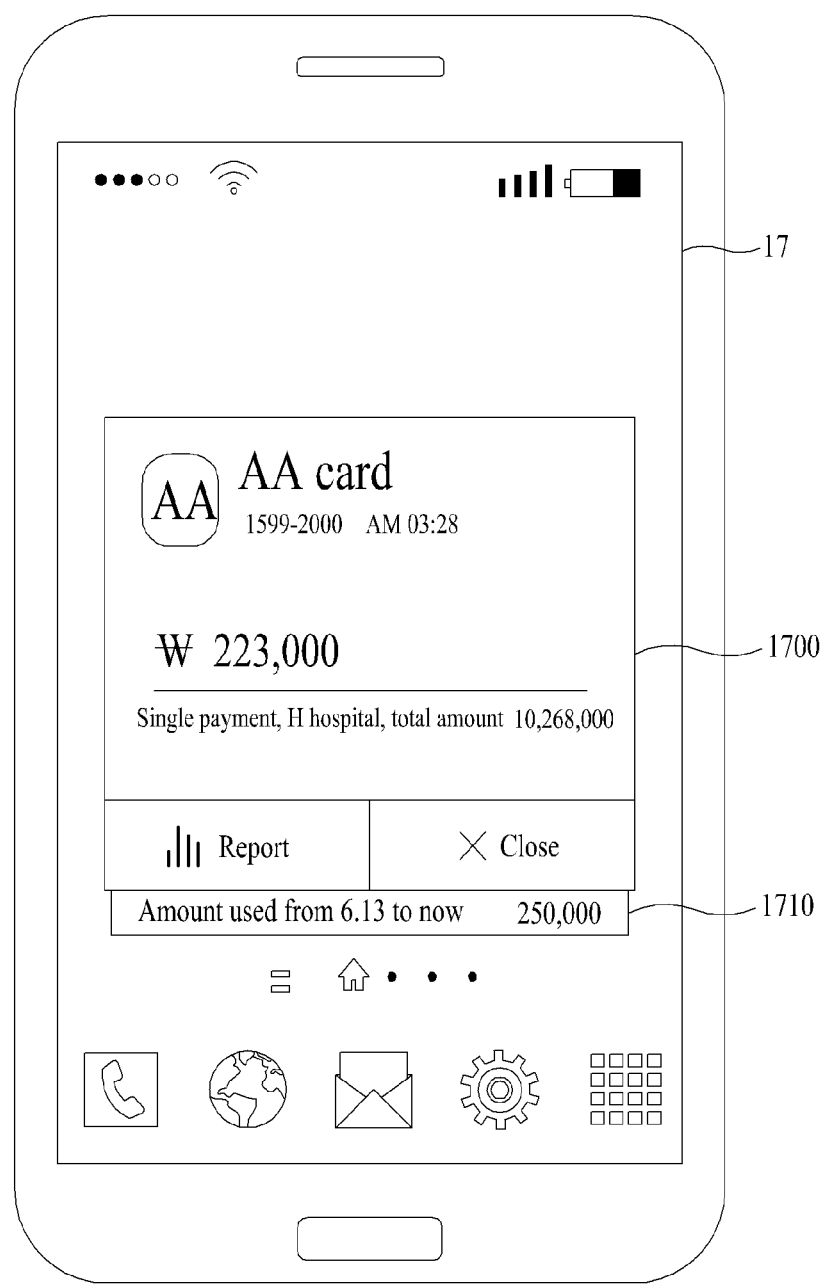
FIGS. 17 through 19 illustrate examples of a UI screen for providing additional information associated with a received message according to at least one example embodiment.
Figure 18:
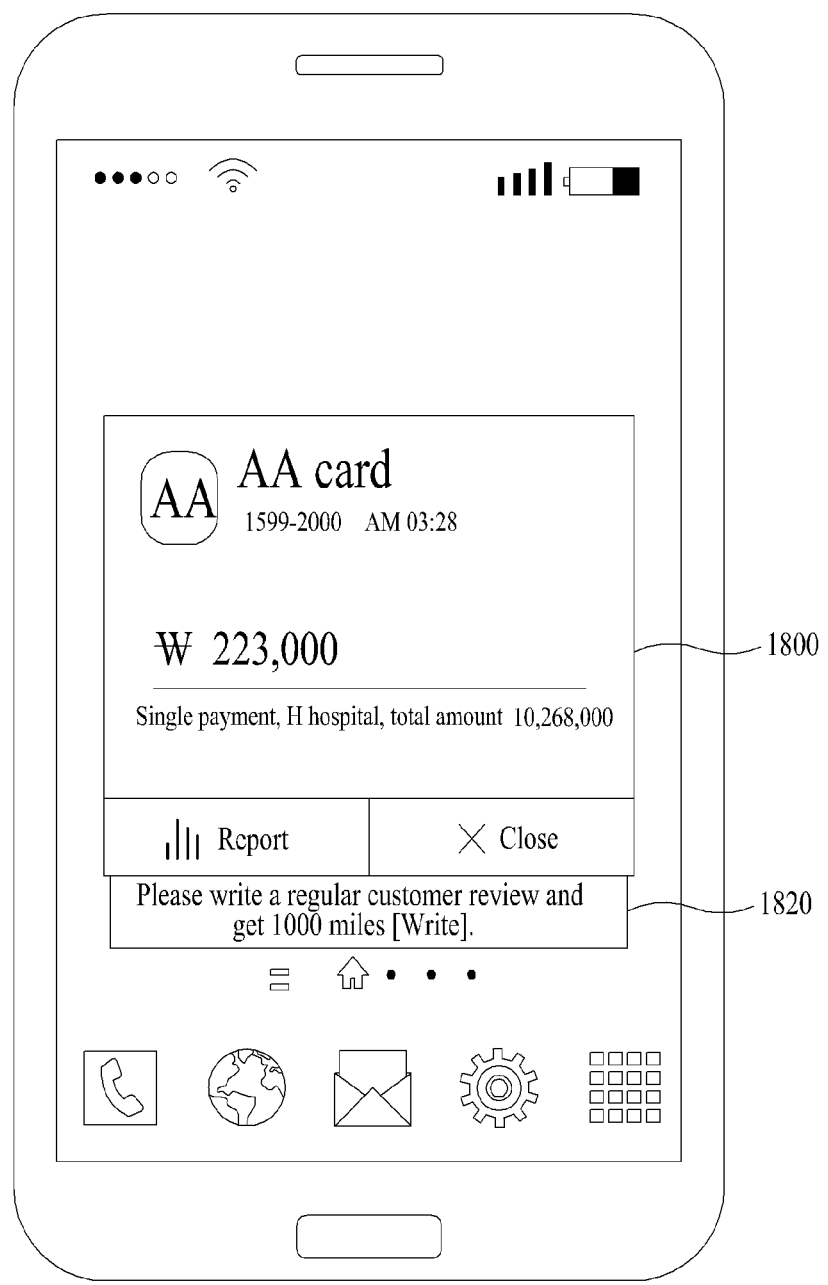
Figure 19:
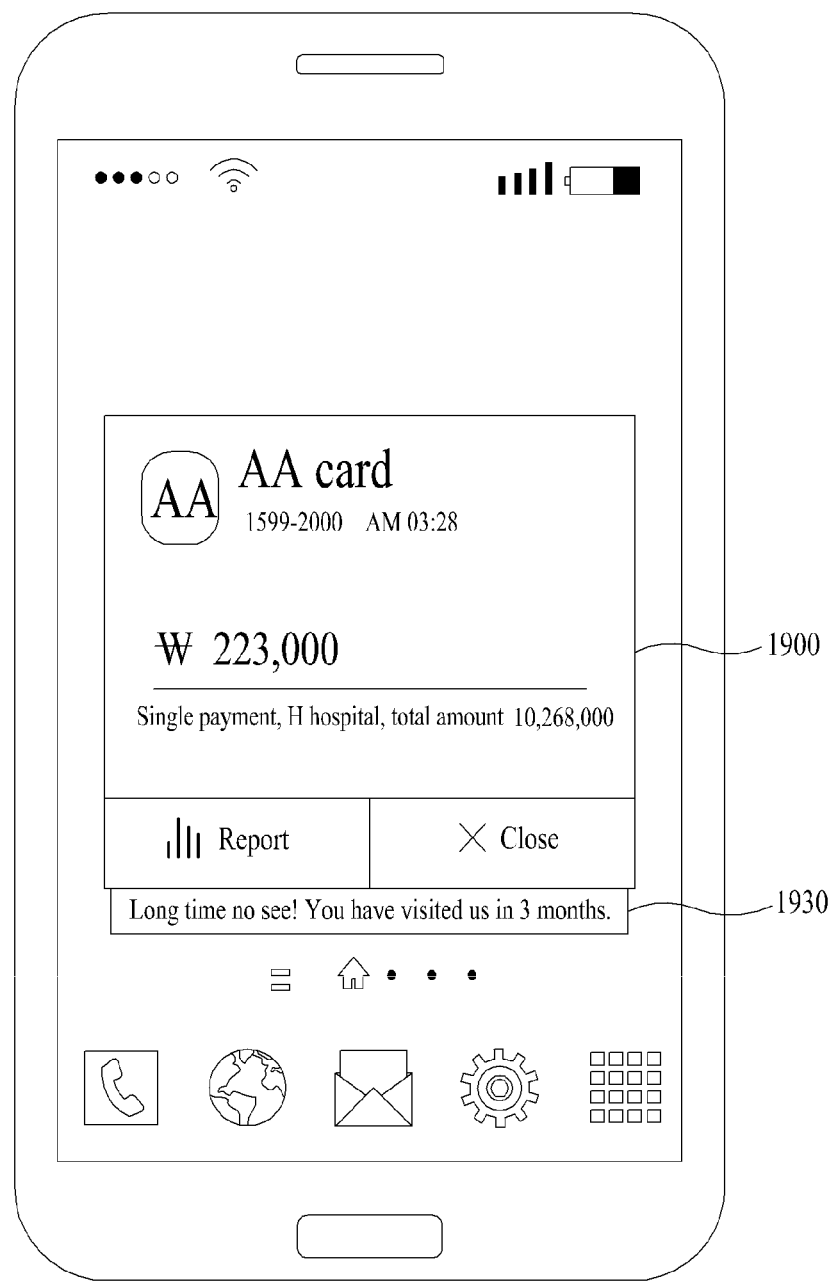

FIGS. 17 through 19 illustrate examples of a UI screen for providing additional information associated with a received message according to at least one example embodiment.

In response to a new message being received at the user terminal 101, the provider 212 may display a notification window including a frame and an action button corresponding to the type of the received message in a popup form. Here, the provider 212 may display additional information associated with the received message at one or more locations adjacent to the notification window.

For example, referring to FIG. 17, if the received message is a payment confirmation message, the provider 212 may display an information window 1710 that includes a card amount used during an aggregation period at a lower end of a received message notification window 1700 when displaying the received message notification window 1700 on a screen 17 of the user terminal 101. As another example, referring to FIG. 18, the provider 212 may display an information window 1820 that includes an event guide associated with a card used place at a lower end of a received message notification window 1800. As another example, referring to FIG. 19, the provider 212 may display an information window 1930 that includes a transaction period, for example, a payment period, of a card used place at a lower end of a received message notification window 1900.

That is, the provider 212 may provide additional information associated with a received message together with a notification window for the received message. An information window that includes additional information may include different content based on a message type. Here, the additional information provided using the information window may be determined in advance at a service. Alternatively, user desired information may be provided for each message type based on user settings.

The message reception notifying method according to example embodiments may include a further reduced number of operations or additional operations based on detailed description of the message reception notifying system described with reference to FIGS. 1 through 19. Also, two or more operations may be combined and orders or locations thereof may be modified.

Screens of FIGS. through 19 are provided as examples only to help the understanding of the disclosure and convenience of description, and a configuration, order, etc., of a screen may be modified.

Figure 20:
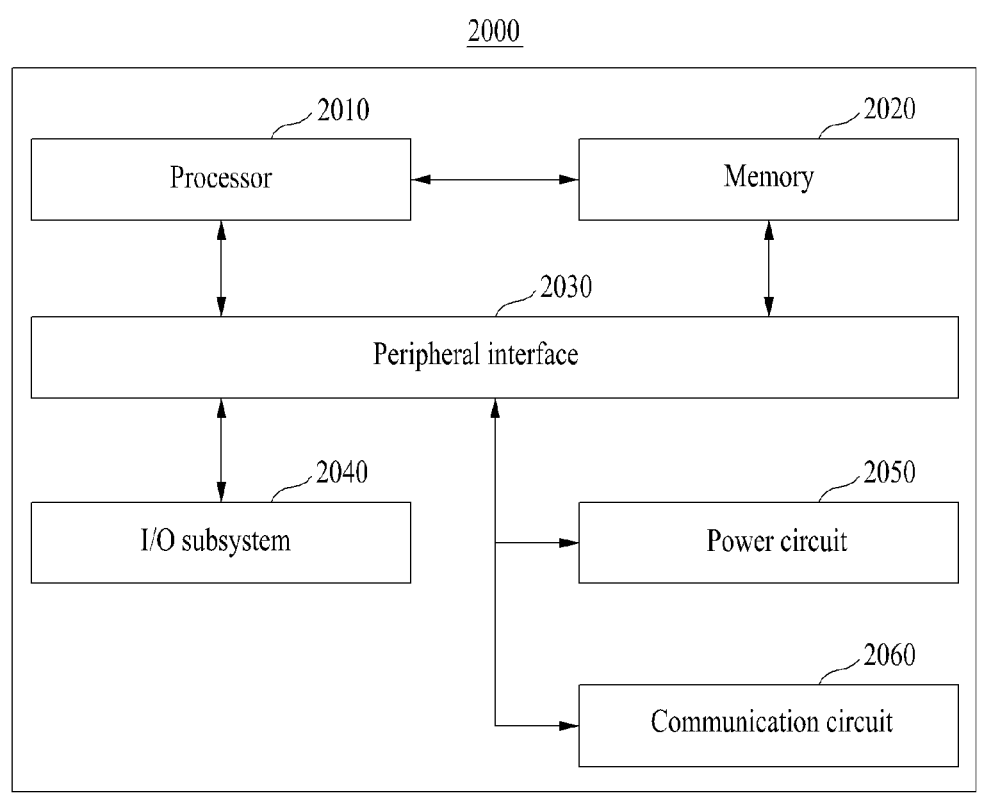
FIG. 20 is a block diagram illustrating a configuration of a computer system according to at least one example embodiment.

FIG. 20 is a block diagram illustrating a configuration of a computer system according to at least one example embodiment. Referring to FIG. 20, a computer system 2000 includes at least one processor 2010, a memory 2020, a peripheral interface 2030, an input/output (I/O) subsystem 2040, a power circuit 2050, and a communication circuit 2060. The computer system 2000 may correspond to the user terminal 101.

The memory 2020 may include, for example, a high-speed random access memory (HSRAM), a magnetic disk, a static random access memory (SRAM), a dynamic RAM (DRAM), read only memory (ROM), a flash memory, and a non-volatile memory. The memory 2020 may include a software module, an instruction set, or a variety of data required for an operation of the computer system 2000. Here, an access from another component such as the processor 2010 and the peripheral interface 2030 to the memory 2020 may be controlled by the processor 2010.

The peripheral interface 2030 may couple an input device and/or an output device of the computer system 2000 with the processor 2010 and the memory 2020. The processor 2010 may perform a variety of functions for the computer system 2000 and process data by executing the software module or the instruction set stored in the memory 2020.

The I/O subsystem 2040 may couple various I/O peripheral devices with the peripheral interface 2030. For example, the I/O subsystem 2040 may include a controller for coupling the peripheral interface 2030 and a peripheral device, such as a monitor, a keyboard, a mouse, a printer, and a touch screen or a sensor depending on a necessity. The I/O peripheral devices may be coupled with the peripheral interface 2030 without using the I/O subsystem 2040.

The power circuit 2050 may supply a power to all of or a portion of components of a terminal. For example, the power circuit 2050 may include a power management system, at least one power source such as a battery and alternating circuit (AC), a charge system, a power failure detection circuit, a power converter or inverter, a power status indicator, or other components for creating, managing and distributing power.

The communication circuit 2060 enables communication with another computer system using at least one external port. Alternatively, as described above, the communication circuit 2060 may enable communication with another computer system by including a radio frequency (RF) circuit and thereby transmitting and receiving an RF signal known as an electromagnetic signal.

The embodiment of FIG. 20 is only an example of the computer system 2000. The computer system 2000 may have a configuration or an arrangement for omitting a portion of the components illustrated in FIG. 20, further including components not illustrated in FIG. 20, or coupling two or more components. For example, a computer system for a communication terminal of a mobile environment may further include a touch screen, a sensor, and the like, in addition to the components of FIG. 20. A circuit for RF communication using a variety of communication methods, for example, wireless fidelity (Wi-Fi), 3rd generation (3G), long term evolution (LTE), Bluetooth, near field communication (NFC), and ZigBee, may be included in the communication circuit 2060. Components includable in the computer system 2000 may be configured as hardware that includes an integrated circuit specified for at least one signal processing or application, software, or a combination of hardware and software.

As described above, according to some example embodiments, it is possible to further effectively notify a reception of a message by providing a message-oriented notification environment using a different format of a notification window based on a message type. Also, according to some example embodiments, it is possible to improve accessibility to a message related function by providing a UI included in a notification window into consideration of a user action predictable based on content of a message and by flexibly configuring the UI based on a message type.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A message reception notifying method implemented in a computer, the method comprising:
predefining a plurality of message types for classifying a message received and a plurality of frames for displaying information included in the received message on a screen of a user terminal, each of the frames being in a predefined format corresponding to one of the predefined plurality of message types, wherein the predefined formats of the frames are different from each other;
parsing the message received at the user terminal, and determining a type of the received message among the plurality of message types;
determining a frame corresponding to the type of the received message from among the predefined plurality of frames, the determined frame including a name of a sender of the received message, at least a portion of message content of the received message and at least one user interface button for responding to the message content; and
creating and displaying the determined frame in a notification window on the screen of the user terminal including the name of the sender, the portion of message content and at least one user interface button for responding to the message content, to initially notify receipt of the received message to the user, without a user interaction on the screen of the user terminal to display the determined frame.

2. The method of claim 1, wherein the plurality of message types for classifying the message are defined based on at least one of criteria that include information regarding whether file download link information is included in the message, whether a file to be downloaded through the message is included in a malicious code database, whether an authentication number or an approval number is included in the message, whether the name of the sender of the message is included in a financial company information database, whether card payment details are included in a text of the message, whether payment due information is included in the text of the message, whether banking transaction details are included in the text of the message, and whether a desired phrase or keyword is included in the text of the message.

3. The method of claim 1, wherein the determining of the frames for the respective message types comprises defining at least one of a display attribute and the user interface button for each message type.

4. The method of claim 1, wherein the frame of the notification window has a different display attribute based on the type of the received message.

5. The method of claim 1, wherein the notification window interworks with at least one of an itinerary function for registering an itinerary associated with the message and a quick reply function for directly sending a reply on the notification window.

6. The method of claim 1, wherein the notification window includes a UI button having a configuration based on the type of the received message, and the UI button is configured to have at least one of a function of deleting a message based on the message type, a function of processing the message to be read, a function of adding the message to a block list, a function of adding the message to a safe list, a function of transferring a reply using a common phrase, a function of registering an itinerary associated with the message, a function of adding a tag to the message, a function of providing accumulated information or statistical information associated with the message, a function of changing the message type, a function of landing a delivery reference page through a link included in the message, and a function of setting a re-alerting time or a repeating period of a notification window for the message.

7. The method of claim 1, wherein the notification window for the received message is displayed in a popup form on the screen of the user terminal in response to the receipt of the message at the user terminal.

8. The method of claim 1, further comprising:
providing notification information about the received message in a banner form on the screen of the user terminal.

9. The method of claim 8, wherein the providing of the notification information comprises displaying a message that is processed to be unread in a message box associated with the user terminal in a form of a notification banner on one side of a UI screen on which a message list of the message box is displayed.

10. The method of claim 1, further comprising:
providing a notification center on the user terminal in which notification information about the received message is configured as a card list.

11. The method of claim 10, wherein the providing of the notification center comprises configuring received messages that are processed to be unread as the card list using a card having a different display attribute based on a message type.

12. The method of claim 1, further comprising:
providing additional information associated with the received message at one or more locations adjacent to the notification window on the screen of the user terminal.

13. A non-transitory computer-readable recording medium storing a computer program to implement a message reception notifying method, the program causing a computer to execute the steps comprising:
predefining a plurality of message types for classifying a message received and a plurality of frames for displaying information included in the received message on a screen of a user terminal, each of the frames being in a predefined format for corresponding to one of the predefined plurality of message types, wherein the predefined formats of the frames are different from each other;
parsing the message received at the user terminal, and determining a type of the received message among the plurality of message types;
determining a frame corresponding to the type of the received message from among the predefined plurality of frames, the determined frame including a name of a sender of the received message, at least a portion of message content of the received message and at least one user interface button for responding to the message content; and
creating and displaying the determined frame in a notification window on the screen of the user terminal including the name of the sender, the portion of message content and at least one user interface button for responding to the message content, to initially notify receipt of the received message to the user, without a user interaction on the screen of the user terminal to display the determined frame.

14. A message reception notifying system comprising:
a processor configured to include a plurality of functional units each executing a corresponding predefined function, the plurality of functional units including,
a determiner configured to parse a message received at a user terminal, and to determine a type of the received message among a plurality of message types, wherein the plurality of message types for classifying the received message and a plurality of frames for displaying information included in the received message on a screen of a user terminal are predefined, each of the plurality of frames is in a predefined format corresponding to one of the predefined plurality of message types, and the predefined formats of the frames are different from each other; and
a provider configured to determine a frame corresponding to the type of the received message from among the predefined plurality of frames, the determined frame including a name of a sender of the received message, at least a portion of message content of the received message and at least one user interface button for responding to the message content, and to create and display the determined frame in a notification window on the screen of user terminal including the name of the sender, the portion of message content and at least one user interface button for responding to the message content, to initially notify receipt of the received message to the user, without a user interaction on the screen of the user terminal to display the determined frame.

15. The message reception notifying system of claim 14, wherein the plurality of message types for classifying the message are defined based on at least one of criteria that include information regarding whether file download link information is included in the message, whether a file downloaded through the message is included in a malicious code database, whether an authentication number or an approval number is included in the message, whether the name of the sender of the message is included in a financial company information database, whether card payment details are included in a text of the message, whether payment due information is included in the text of the message, whether banking transaction details are included in the text of the message, and whether a desired phrase or keyword is included in the text of the message.

16. The message reception notifying system of claim 14, wherein the frame of the notification window has a different display attribute, and the user interface button has a different configuration based on the type of the received message.

17. The message reception notifying system of claim 14, wherein the notification window interworks with at least one of an itinerary function for registering an itinerary associated with the message and a quick reply function for directly sending a reply on the notification window.

18. The message reception notifying system of claim 14, wherein the provider is further configured to provide notification information about the received message in a banner form on the screen of the user terminal, and to display a message that is processed to be unread in a message box associated with the user terminal in a form of a notification banner on one side of a UI screen on which a message list of the message box is displayed.

19. The message reception notifying system of claim 14, wherein the provider is further configured to provide a notification center in which notification information about the received message is configured as a card list, and to configure received messages that are processed to be unread as a card list using a card having a different display attribute based on a message type.

20. The message reception notifying system of claim 14, wherein the provider is further configured to provide additional information associated with the received message at one or more locations adjacent to the notification window on the screen of the user terminal.

* * * * *